United States Patent
Matsumoto et al.

(10) Patent No.: US 9,688,300 B2
(45) Date of Patent: Jun. 27, 2017

(54) METHOD FOR MANUFACTURING STEERING DEVICE

(71) Applicant: NSK LTD., Tokyo (JP)

(72) Inventors: Yukihiro Matsumoto, Gunma (JP); Naoki Sawada, Gunma (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 15/108,631

(22) PCT Filed: Feb. 12, 2015

(86) PCT No.: PCT/JP2015/053840
§ 371 (c)(1),
(2) Date: Jun. 28, 2016

(87) PCT Pub. No.: WO2015/137036
PCT Pub. Date: Sep. 17, 2015

(65) Prior Publication Data
US 2016/0325795 A1  Nov. 10, 2016

(30) Foreign Application Priority Data

Mar. 13, 2014 (JP) .................................. 2014-050240
Mar. 13, 2014 (JP) .................................. 2014-050241

(51) Int. Cl.
*B62D 65/00* (2006.01)
*B62D 1/184* (2006.01)
(Continued)

(52) U.S. Cl.
CPC ............. *B62D 1/185* (2013.01); *B62D 1/184* (2013.01); *B62D 1/189* (2013.01); *B62D 1/192* (2013.01); *B62D 65/00* (2013.01)

(58) Field of Classification Search
CPC ........ B62D 65/00; B62D 1/192; B62D 1/189; B62D 1/184; B62D 1/185
See application file for complete search history.

(56) References Cited

U.S. PATENT DOCUMENTS 3,667,988 A * 6/1972 Seinosuke ............. B05B 15/045
118/504

FOREIGN PATENT DOCUMENTS

| JP | 59127359 | * 7/1984 |
| JP | 60-242913 A | 12/1985 |

(Continued)

OTHER PUBLICATIONS

International Search Report for PCT/JP2015/053840 dated May 19, 2015.

*Primary Examiner* — John C Hong
(74) *Attorney, Agent, or Firm* — Sughrue Mion, PLLC

(57) ABSTRACT

According to an aspect, a steering device includes: an outer shaft disposed around a center axis and includes an inner space with a spline hole portion; and an inner shaft that includes a spline shaft portion including a surface disposed around the center axis, at least a part of the inner shaft being disposed in the inner space. The spline shaft portion includes a first spline shaft portion including a first surface formed of synthetic resin and includes a second spline shaft portion including a second surface formed of metal. A distance between the center axis and the second surface is smaller than a distance between the center axis and the first surface. The spline hole portion and the first spline shaft portion are spline-fitted to each other, and the outer shaft and the inner shaft are relatively movable in the axial direction.

9 Claims, 23 Drawing Sheets

(51) Int. Cl.
*B62D 1/189* (2006.01)
*B62D 1/19* (2006.01)
*B62D 1/185* (2006.01)

(56) References Cited

FOREIGN PATENT DOCUMENTS

| | | |
|---|---:|---|
| JP | 6-74229 A | 3/1994 |
| JP | 2002-321627 A | 11/2002 |
| JP | 2004-148945 A | 5/2004 |
| JP | 2006-36152 A | 2/2006 |
| JP | 2010-127295 A | 6/2010 |
| JP | 2011-174607 A | 9/2011 |
| JP | 2013-18397 A | 1/2013 |

* cited by examiner

METHOD FOR MANUFACTURING STEERING DEVICE

This application is a National Stage of PCT international application Ser. No. PCT/JP2015/053840 filed on Feb. 12, 2015 which designates the United States, incorporated herein by reference, and which is based upon and claims the benefit of priority from Japanese Patent Application No. 2014-050240 filed on Mar. 13, 2014, and Japanese Patent Application No. 2014-050241 filed on Mar. 13, 2014, the entire contents of which are incorporated herein by reference.

FIELD

The present invention relates to a method for manufacturing a steering device.

BACKGROUND

As additional mechanisms of a steering device, there are known a position adjustment mechanism that adjusts the position of a steering wheel, an impact absorbing mechanism that absorbs an impact generated in secondary collision, and a locking mechanism that regulates the operation of a steering wheel. The position adjustment mechanism includes a telescopic mechanism that adjusts the position of a steering wheel in the front and rear direction and a tilting mechanism that adjusts the position of a steering wheel in the up and down direction. An example of a steering device including the telescopic mechanism is disclosed in Patent Literature 1.

CITATION LIST

Patent Literature

Patent Literature 1: Japanese Patent Application Laid-open No. 2006-036152

SUMMARY

Technical Problem

The telescopic mechanism includes a steering shaft with an outer shaft and an inner shaft spline-fitted to the outer shaft. The steering wheel is connected to one end of the steering shaft. When the outer shaft and the inner shaft relatively move in the axial direction parallel to the center axes of the outer shaft and the inner shaft, the steering shaft moves in a telescopic manner. Accordingly, the position of the steering wheel in the front and rear direction is adjusted.

A process of manufacturing the steering device includes a step of inserting the inner shaft into the outer shaft. When the inner shaft is not smoothly inserted into the outer shaft and, for example, at least a part of the inner shaft is damaged, there is a possibility that a force (a sliding force) generated when moving the steering shaft in a telescopic manner may be changed. As a result, there is a possibility that the performance of the steering device may be degraded.

An aspect of the invention is to provide a steering device capable of being smoothly manufactured and suppressing degradation in performance and a method for manufacturing a steering device.

Solution to Problem

According to a first aspect of the invention, there is provided a steering device including: an outer shaft that is disposed around a center axis and includes an inner space with a spline hole portion; and an inner shaft that includes a spline shaft portion including a surface disposed around the center axis, at least a part of the inner shaft being disposed in the inner space, wherein the spline shaft portion includes a first spline shaft portion including a first surface formed of synthetic resin and includes a second spline shaft portion that is disposed adjacent to one side of the first spline shaft portion in an axial direction parallel to the center axis, includes one end of the inner shaft disposed in the inner space, and includes a second surface formed of metal, wherein a distance between the center axis and the second surface is smaller than a distance between the center axis and the first surface, and wherein the spline hole portion and the first spline shaft portion are spline-fitted to each other, and the outer shaft and the inner shaft are relatively movable in the axial direction.

According to the first aspect of the invention, since the first surface of the first spline shaft portion is formed of the synthetic resin, it is possible to suppress the generation of rattling, the degradation in steering feeling, and the generation of abnormal sound caused by the clearance between the male spline and the female spline when the first spline shaft portion and the spline hole portion are spline-fitted to each other. When the inner shaft is inserted into the inner space of the outer shaft, the inner shaft is inserted into the inner space of the outer shaft from one end thereof. The distance between the center axis and the second surface is smaller than the distance between the center axis and the first surface. That is, the diameter of the second spline shaft portion including one end of the inner shaft is smaller than that of the first spline shaft portion. Accordingly, the step of inserting the inner shaft into the outer shaft is smoothly performed. Further, the surface of the second spline shaft portion is formed of metal. Damage or marking hardly occurs in the metal surface compared with the synthetic resin surface. For that reason, even when the second spline shaft portion contacts the outer shaft in the step of inserting the inner shaft into the outer shaft, damage to the surface of the second spline shaft portion and marking on the surface of the second spline shaft portion are suppressed. There is a possibility that the contact between the synthetic resin and the outer shaft may degrade the state of the synthetic resin surface and peel the synthetic resin. As a result, there is a possibility that a force (a sliding force) generated when relatively moving the outer shaft and the inner shaft in the axial direction so as to move the steering shaft in a telescopic manner may change so that the steering shaft is not smoothly moved in a telescopic manner. Since the surface of the second spline shaft portion is not provided with the synthetic resin, a change in sliding force is suppressed and hence the steering shaft is smoothly moved in a telescopic manner. In this way, according to the first aspect of the invention, it is possible to smoothly perform the steering shaft assembling process including the step of inserting the inner shaft into the outer shaft and to stabilize the sliding force. Thus, degradation in performance of the steering device is suppressed.

In the first aspect of the invention, desirably, the spline shaft portion includes a metallic core provided with a spline, the first surface includes a surface of a synthetic resin film formed on the surface of the core, and the second surface includes the surface of the core.

Accordingly, a part of the surface of the core is provided with the synthetic resin film, and thus the first spline shaft portion having a large diameter and the second spline shaft portion having a small diameter are smoothly manufactured. Further, both the first spline shaft portion and the second spline shaft portion can be spline-fitted to the spline hole portion and hence the spline-fitting state is stabilized.

In the first aspect of the invention, desirably, the inner space includes a first portion space disposed adjacent to one side of the spline hole portion in the axial direction, a distance between the center axis and an inner surface of the first portion space is larger than a distance between the center axis and an inner surface of the spline hole portion, and the first spline shaft portion is disposed in the spline hole portion while the second spline shaft portion is disposed in the first portion space.

Accordingly, even when the dimension (the spline length) of the spline hole portion of the outer shaft in the axial direction is limited, the dimensions of the portions are adjusted so that the first spline shaft portion is disposed in the spline hole portion while the second spline shaft portion is disposed in the first portion space and thus the spline-fitting state between the first spline shaft portion and the spline hole portion is stabilized. For example, there is a possibility that the first portion space needs to be provided in the outer shaft or the dimension of the spline hole portion needs to be limited in order to install an additional mechanism such as a locking mechanism. When the dimensions of the portions are adjusted so that the second spline shaft portion is disposed in the first portion space and the first spline shaft portion is disposed in the spline hole portion, the spline-fitting state is stabilized. Further, when the partial portion of the spline shaft portion provided with the synthetic resin is disposed in the first portion space, there is a possibility that the synthetic resin disposed in the first portion space may be thermally expanded. When the synthetic resin is thermally expanded, there is a possibility that the sliding force generated during the telescopic movement of the steering shaft increases. Since the synthetic resin is not provided in the second spline shaft portion disposed in the first portion space, a problem in which the synthetic resin in the first portion space is thermally expanded does not arise. Since the first spline shaft portion including the synthetic resin is disposed in the spline hole portion, the thermal expansion of the synthetic resin is suppressed by the spline hole portion.

In the first aspect of the invention, desirably, a state where the second spline shaft portion is disposed in the first portion space includes a state where the inner shaft is disposed at a position closest to one end in a movable range of the inner shaft with respect to the outer shaft in the axial direction.

Accordingly, in a state where the steering shaft is shortened most, the second spline shaft portion is disposed in the first portion space and the first spline shaft portion is disposed in the spline hole portion. For example, when the steering shaft as a product is transported, the steering shaft is often transported in the minimal telescopic state from the viewpoint of the efficiency of the transportation. For example, when the steering shaft is transported from a low-temperature country in which the product is manufactured to a high-temperature country in which a vehicle is assembled, there is a possibility that the synthetic resin is largely thermally expanded. When the dimensions of the portions are adjusted so that the second spline shaft portion is disposed in the first portion space and the first spline shaft portion is disposed in the spline hole portion in a state where the steering shaft is shortened most, the thermal expansion of the synthetic resin is suppressed even during transportation. Accordingly, an increase in sliding force caused by the thermal expansion of the synthetic resin is suppressed. Further, when the steering shaft is lengthened, both the first spline shaft portion and the second spline shaft portion can be spline-fitted to the spline hole portion.

In the first aspect of the invention, desirably, the first spline shaft portion is continuously disposed inside the spline hole portion in the movable range.

Accordingly, the thermal expansion of the synthetic resin is suppressed, and the generation of rattling during the rotation of the steering shaft is suppressed.

In the first aspect of the invention, the spline shaft portion may include a third spline shaft portion disposed adjacent to the other side of the first spline shaft portion in the axial direction and including a third surface formed of metal.

Accordingly, the synthetic resin usage amount is decreased. Further, by increasing the dimension of the third spline shaft portion in the axial direction to increase the entire dimension of the spline shaft portion in the axial direction, the spline-fitting state between the third spline shaft portion and the spline hole portion is maintained even when the steering shaft is shortened by the secondary collision.

In the first aspect of the invention, desirably, the steering device further includes: a first column that is disposed around the inner shaft, a relative position of the first column with respect to the inner shaft in the axial direction being substantially fixed; and a second column that is disposed around the outer shaft, a relative position of the second column with respect to the outer shaft in the axial direction being substantially fixed, wherein at least a part of the second spline shaft portion is disposed outside one end of the first column in the axial direction, and wherein an end surface of the other end of the second column and an end surface of the other end of the outer shaft in the axial direction are disposed within the same plane.

Accordingly, the step of inserting the inner shaft into the outer shaft is smoothly performed. Further, the inner shaft and the first column are sufficiently fitted to the outer shaft and the second column, and hence the spline-fitting rigidity is ensured. Thus, degradation in performance of the steering device is suppressed.

According to a second aspect of the invention, there is provided a method for manufacturing a steering device including: manufacturing an outer shaft including an inner space with a spline hole portion; manufacturing a metallic core including a spline shaft portion with a surface disposed around a center axis; processing the surface of the spline shaft portion so as to manufacture an inner shaft including a first spline shaft portion and a second spline shaft portion, the first spline shaft portion including a first surface formed of synthetic resin, the second spline shaft portion being disposed adjacent to one side of the first spline shaft portion in the axial direction parallel to the center axis, including one end of the core disposed in the inner space, and including a second surface formed of metal, a distance between the second surface and the center axis being smaller than a distance between the center axis and the first surface; and inserting the second spline shaft portion into the inner space and spline-fitting the spline hole portion and the first spline shaft portion to each other so that the outer shaft and the inner shaft relatively move in the axial direction.

According to the second aspect of the invention, the steering device is smoothly manufactured, and degradation in performance of the manufactured steering device is suppressed.

In the second aspect of the invention, desirably, the method for manufacturing a steering device further includes: covering a part of a surface of the spline shaft portion including one end of the core by a mask member; and supplying synthetic resin to the spline shaft portion covered by the mask member so as to form the first spline shaft portion.

Accordingly, the first spline shaft portion with the synthetic resin and the second spline shaft portion without the synthetic resin are smoothly manufactured.

In the second aspect of the invention, the mask member may include a cap member provided with a spline.

Accordingly, the synthetic resin is supplied to the spline shaft portion while the male spline of the spline shaft portion is fitted to the female spline of the cap member, and thus the first spline shaft portion with the synthetic resin and the second spline shaft portion without the synthetic resin are smoothly manufactured.

In the second aspect of the invention, desirably, the method for manufacturing a steering device further includes fixing the cap member and the spline shaft portion by a magnet provided in the cap member.

Accordingly, during the supply of the synthetic resin, the separation between the cap member and the spline shaft portion is suppressed due to the magnetic force of the magnet.

In the second aspect of the invention, desirably, the method for manufacturing a steering device further includes: disposing a first column around the inner shaft so that the second spline shaft portion is disposed outside one end of the first column and so that a relative position of the first column with respect to the inner shaft in the axial direction is substantially fixed; disposing a second column around the outer shaft so that an end surface of the other end of the outer shaft and an end surface of the other end of the second column in the axial direction are disposed within the same plane and so that a relative position of the second column with respect to the outer shaft in the axial direction is substantially fixed; inserting the second spline shaft portion into the outer shaft; and coupling the first column and the second column to each other.

Accordingly, the step of inserting the inner shaft into the outer shaft is smoothly performed. Further, the inner shaft and the first column are sufficiently fitted to the outer shaft and the second column, and hence the spline-fitting rigidity is ensured. Thus, degradation in performance of the steering device is suppressed.

According to a third aspect of the invention, there is provided a steering device including: an outer shaft that is disposed around a center axis and includes an inner space with a spline hole portion; and an inner shaft at least a part of which is disposed in the inner space, wherein the inner shaft includes a first spline shaft portion including a synthetic resin surface disposed around the center axis and includes a shaft portion that is disposed adjacent to one side of the first spline shaft portion in an axial direction parallel to the center axis, includes one end of the inner shaft disposed in the inner space, and includes a synthetic resin surface disposed around the center axis, wherein a distance between the center axis and the surface of the shaft portion is smaller than a distance between the center axis and the surface of the first spline shaft portion, and wherein the spline hole portion and the first spline shaft portion are spline-fitted to each other, and the outer shaft and the inner shaft are relatively movable in the axial direction.

According to the third aspect of the invention, since the surface of the first spline shaft portion is formed of the synthetic resin, it is possible to suppress the generation of rattling, the degradation in steering feeling, and the generation of abnormal sound caused by the clearance between the male spline and the female spline when the first spline shaft portion and the spline hole portion are spline-fitted to each other. When the inner shaft is inserted into the inner space of the outer shaft, the inner shaft is inserted into the inner space of the outer shaft from one end thereof. The distance between the center axis and the surface of the shaft portion is smaller than the distance between the center axis and the first spline shaft portion. That is, the diameter of the shaft portion including one end of the inner shaft is smaller than that of the first spline shaft portion. Accordingly, the step of inserting the inner shaft into the outer shaft is smoothly performed. Further, the diameter of the shaft portion is smaller than that of the first spline shaft portion, and the contact between the shaft portion and the outer shaft is suppressed in the step of inserting the inner shaft into the outer shaft. Accordingly, it is possible to suppress damage to the surface of the shaft portion and marking on the surface of the shaft portion. There is a possibility that the damage and the marking of the surface of the shaft portion may degrade the state of the surface of the shaft portion and peel the synthetic resin of the shaft portion. As a result, there is a possibility that a force (a sliding force) generated when relatively moving the outer shaft and the inner shaft in the axial direction so as to move the steering shaft in a telescopic manner may change so that the steering shaft is not smoothly moved in a telescopic manner. Damage and marking in the shaft portion having a small diameter are suppressed. Thus, a change in sliding force is suppressed, and hence the steering shaft is smoothly moved in a telescopic manner. In this way, according to the first aspect of the invention, it is possible to smoothly perform the steering device assembling process including the step of inserting the inner shaft into the outer shaft and to stabilize the sliding force. Thus, degradation in performance of the steering device is suppressed.

In the third aspect of the invention, desirably, the inner shaft includes a metallic core at least a part of which is provided with a spline, and each of the surface of the first spline shaft portion and the surface of the shaft portion includes a surface of a synthetic resin film formed on the surface of the core.

Accordingly, the surface of the core is provided with the synthetic resin film, and thus it is possible to smoothly manufacture the inner shaft that includes the first spline shaft portion having a large diameter and the shaft portion having a small diameter and is hardly rattled.

In the third aspect of the invention, the shaft portion may include a second spline shaft portion with a spline having a tooth height smaller than a tooth height of a spline of the first spline shaft portion.

Accordingly, both the first spline shaft portion and the second spline shaft portion are spline-fitted to the spline hole portion, so that the spline-fitting state is stabilized.

In the third aspect of the invention, the shaft portion may include a cylindrical portion without a spline.

Accordingly, the contact between the cylindrical portion and the outer shaft is sufficiently suppressed in the step of inserting the inner shaft into the outer shaft.

In the third aspect of the invention, desirably, the inner space includes a first portion space disposed adjacent to one side of the spline hole portion in the axial direction, a distance between the center axis and an inner surface of the first portion space is larger than a distance between the center axis and an inner surface of the spline hole portion, and the first spline shaft portion is disposed in the spline hole portion while the shaft portion is disposed in the first portion space.

Accordingly, even when the dimension (the spline length) of the spline hole portion of the outer shaft in the axial direction is limited, the spline-fitting state between the first spline shaft portion and the spline hole portion is stabilized in that the dimensions of the portions are adjusted so that the first spline shaft portion is disposed in the spline hole portion while the shaft portion is disposed in the first portion space. For example, there is a possibility that the first portion space needs to be provided in the outer shaft or the dimension of the spline hole portion needs to be limited in order to install an additional mechanism such as a locking mechanism. When the dimensions of the portions are adjusted so that the shaft portion is disposed in the first portion space and the first spline shaft portion is disposed in the spline hole portion, the spline-fitting state is stabilized. Further, when the shaft portion provided with the synthetic resin is disposed in the first portion space, there is a possibility that the synthetic resin disposed in the first portion space may be thermally expanded. When the synthetic resin is thermally expanded, there is a possibility that the sliding force generated during the telescopic movement of the steering shaft may increase. Since the outer diameter of the shaft portion disposed in the first portion space has a small diameter, it is possible to suppress the outer diameter of the shaft portion from becoming larger than the outer diameter of the first spline shaft portion even when the synthetic resin of the shaft portion is thermally expanded. Since the first spline shaft portion is disposed in the spline hole portion, the thermal expansion of the synthetic resin of the first spline shaft portion is suppressed by the spline hole portion.

In the third aspect of the invention, desirably, a state where the shaft portion is disposed in the first portion space includes a state where the inner shaft is disposed at a position closest to one end of a movable range of the inner shaft with respect to the outer shaft in the axial direction.

Accordingly, in a state where the steering shaft is shortened most, the shaft portion is disposed in the first portion space, and the first spline shaft portion is disposed in the spline hole portion. For example, when the steering shaft as a product is transported, the steering shaft is often transported in the minimal telescopic state from the viewpoint of the efficiency of the transportation. For example, when the steering shaft is transported from a low-temperature country in which the product is manufactured to a high-temperature country in which a vehicle is assembled, there is a possibility that the synthetic resin is largely thermally expanded. When the dimensions of the portions are adjusted so that the shaft portion is disposed in the first portion space and the first spline shaft portion is disposed in the spline hole portion in a state where the steering shaft is shortened most, it is possible to prevent the outer diameter of the shaft portion from becoming larger than the outer diameter of the first spline shaft portion since the outer diameter of the shaft portion is small even when the synthetic resin of the shaft portion is thermally expanded during the transportation thereof. Accordingly, an increase in sliding force is suppressed.

In the third aspect of the invention, desirably, the first spline shaft portion is continuously disposed inside the spline hole portion in the movable range.

Accordingly, the thermal expansion of the synthetic resin of the first spline shaft portion is suppressed, and the generation of rattling and abnormal sound during the rotation of the steering shaft are suppressed.

In the third aspect of the invention, the inner shaft may include a third spline shaft portion that is disposed adjacent to the other side of the first spline shaft portion in the axial direction and includes a metal surface.

Accordingly, the synthetic resin usage amount is decreased. Further, by increasing the dimension of the third spline shaft portion in the axial direction to increase the entire dimension of the spline shaft portion in the axial direction, the spline-fitting state between the third spline shaft portion and the spline hole portion is maintained even when the steering shaft is shortened by the secondary collision.

In the third aspect of the invention, desirably, the steering device includes: a first column that is disposed around the inner shaft, a relative position of the first column with respect to the inner shaft in the axial direction being substantially fixed; and a second column that is disposed around the outer shaft, a relative position of the second column with respect to the outer shaft in the axial direction being substantially fixed, wherein at least a part of the shaft portion is disposed outside one end of the first column in the axial direction, and an end surface of the other end of the second column and an end surface of the other end of the outer shaft in the axial direction are disposed within the same plane.

Accordingly, the step of inserting the inner shaft into the outer shaft is smoothly performed. Further, the inner shaft and the first column are sufficiently fitted to the outer shaft and the second column and hence the spline-fitting rigidity is ensured. Thus, degradation in performance of the steering device is suppressed.

According to a fourth aspect of the invention, there is provided a method for manufacturing a steering device including: manufacturing an outer shaft including an inner space with a spline hole portion; manufacturing a metallic core that includes a spline shaft portion including a metal surface disposed around a center axis; processing a partial portion of the spline shaft portion in the axial direction parallel to the center axis, which includes one end of the core disposed in the inner space, so as to form a small-diameter portion including a second surface having a distance to the center axis that is smaller than a distance between the center axis and the first surface; supplying synthetic resin to the core after forming the small-diameter portion so as to manufacture an inner shaft that includes a first spline shaft portion and a shaft portion, the first spline shaft portion including a synthetic resin surface disposed around the center axis, the shaft portion being disposed adjacent to one side of the first spline shaft portion in the axial direction and including a synthetic resin surface disposed around the center axis; and inserting the shaft portion and the first spline shaft portion into the inner space and spline-fitting the spline hole portion and the first spline shaft portion to each other so that the outer shaft and the inner shaft relatively move in the axial direction.

According to the fourth aspect of the invention, the steering device is smoothly manufactured, and degradation in performance of the manufactured steering device is suppressed.

In the fourth aspect of the invention, desirably, the method for manufacturing a steering device includes: disposing a first column around the inner shaft so that the shaft portion is disposed outside one end of the first column and so that a relative position of the first column with respect to the inner shaft in the axial direction is substantially fixed; disposing a second column around the outer shaft so that an end surface of the other end of the outer shaft and an end surface of the other end of the second column in the axial direction are disposed within the same plane and so that a relative position of the second column with respect to the outer shaft in the axial direction is substantially fixed;

inserting the shaft portion and the first spline shaft portion into the outer shaft; and coupling the first column and the second column to each other.

Accordingly, the step of inserting the inner shaft into the outer shaft is smoothly performed. Further, the inner shaft and the first column are sufficiently fitted to the outer shaft and the second column, and hence the spline-fitting rigidity is ensured. Thus, degradation in performance of the steering device is suppressed.

Advantageous Effects of Invention

According to the aspects of the invention, the steering device can be smoothly manufactured, and degradation in performance of the steering device can be suppressed.

DESCRIPTION OF EMBODIMENTS

Hereinafter, embodiments of the invention will be described with reference to the drawings, but the invention is not limited thereto. The components of the embodiments described below can be appropriately combined with one another. Further, a part of the components may not be used. Further, the components of the embodiments below include a component that can be easily replaced by the person skilled in the art or a component that has substantially the same configuration.

First Embodiment

Figure 1:
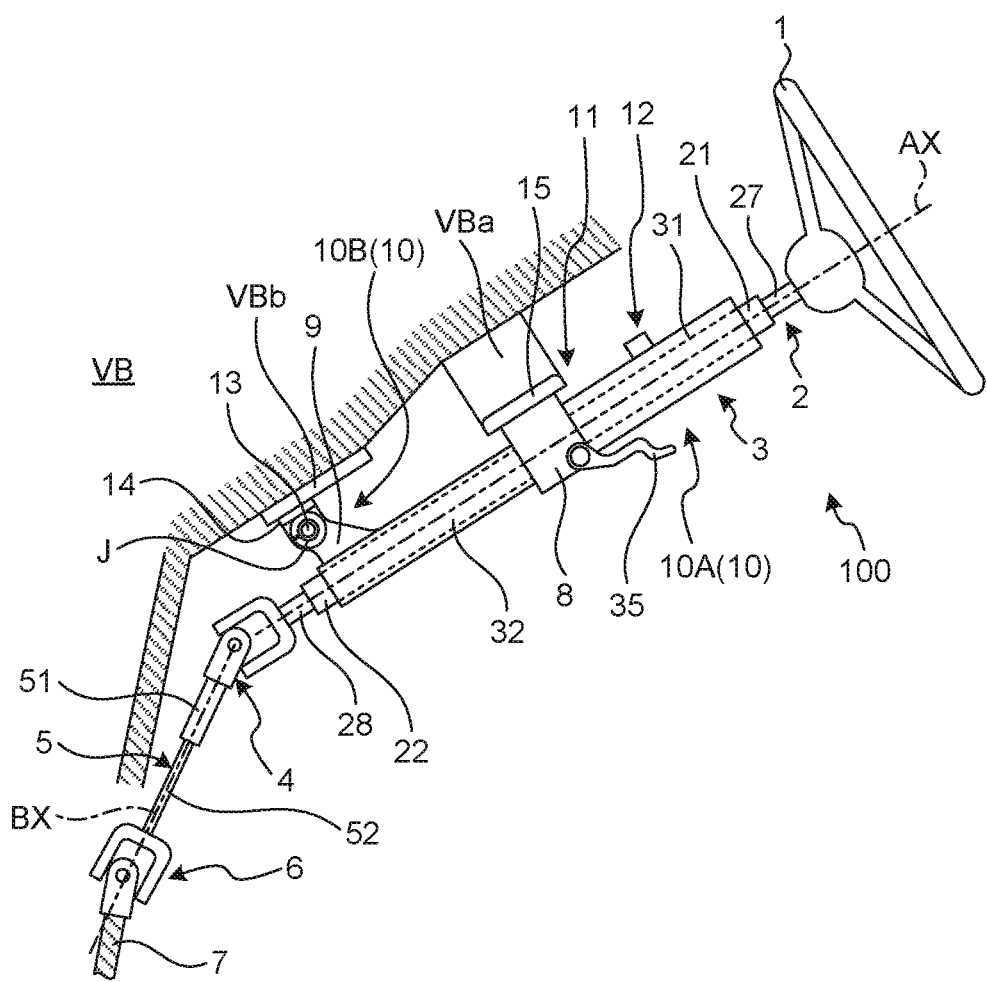
FIG. 1 is a schematic diagram illustrating an example of a steering device according to a first embodiment.

A first embodiment will be described. FIG. 1 is a schematic diagram illustrating an example of a steering device 100 according to the embodiment.

In the description below, a positional relation between components will be described based on a traveling direction in which a vehicle body VB travels while the steering device 100 is attached to the vehicle body VB. An up and down direction indicates the up and down direction of the vehicle body VB. A width direction indicates the width direction of the vehicle body VB and matches the left and right direction. A front and rear direction indicates the front and rear direction of the vehicle body VB. The front side of the vehicle body VB will be appropriately referred to as a front side, and the rear side of the vehicle body VB will be appropriately referred to as a rear side. Further, a portion disposed at the rearmost position of a member will be appropriately referred to as one end or a rear end and a portion disposed at the frontmost position of the member will be appropriately referred to as the other end or a front end.

As illustrated in FIG. 1, the steering device 100 includes a steering wheel 1, a steering shaft 2 that is connected to the steering wheel 1, a steering column 3 that is disposed around the steering shaft 2, an intermediate shaft 5 that is connected to the steering shaft 2 through a universal joint 4, and an input shaft 7 of a steering gear mechanism that is connected to the intermediate shaft 5 through a universal joint 6.

The steering wheel 1 is operated by a driver (an operator). The steering wheel 1 is rotatable about a center axis AX.

The steering shaft 2 is rotatable about the center axis AX. The steering shaft 2 is disposed between the steering wheel 1 and the intermediate shaft 5. One end (the rear end) of the steering shaft 2 is connected to the steering wheel 1. The other end (the front end) of the steering shaft 2 is connected to the intermediate shaft 5 through the universal joint 4. A shaft portion 27 connected to the steering wheel 1 is disposed at one end of the steering shaft 2. A shaft portion 28 connected to the intermediate shaft 5 through the universal joint 4 is disposed at the other end of the steering shaft 2.

The steering shaft 2 includes an upper shaft 21 and a lower shaft 22 that is spline-fitted to the upper shaft 21 so that the steering shaft 2 is able to slide in a direction parallel to the center axis AX and is able to transmit a torque about the center axis AX. The upper shaft 21 and the lower shaft 22 move relatively in a direction parallel to the center axis AX, and thus the steering shaft 2 moves in a telescopic manner, so that a distance between one end and the other end of the steering shaft 2 changes.

The steering column 3 is a cylindrical member and is disposed around the steering shaft 2. The steering column 3 rotatably supports the steering shaft 2. The steering column 3 includes an upper column 31 and a lower column 32, at least a part of the upper column 31 being disposed around the upper shaft 21, at least a part of the lower column 32 being disposed around the lower shaft 22. The upper column 31 and the lower column 32 are fitted to each other so as to be relatively movable in a direction parallel to the center axis AX. When the upper column 31 and the lower column 32 relatively move in a direction parallel to the center axis AX, the steering column 3 is lengthened and shortened, and hence a distance between one end and the other end of the steering column 3 changes.

The intermediate shaft 5 is rotatable about a center axis BX. The center axis AX of the steering shaft 2 intersects the center axis BX of the intermediate shaft 5. The intermediate shaft 5 is disposed between the steering shaft 2 and the input shaft 7. One end of the intermediate shaft 5 is connected to the steering shaft 2 through the universal joint 4. The other end of the intermediate shaft 5 is connected to the input shaft 7 through the universal joint 6.

The intermediate shaft 5 includes an upper shaft 51 and a lower shaft 52 that is spline-fitted to the upper shaft 51. The upper shaft 51 is connected to the steering shaft 2 through the universal joint 4. The lower shaft 52 is connected to the input shaft 7 through the universal joint 6. The upper shaft 51 and the lower shaft 52 are relatively movable in a direction parallel to the center axis BX. When the upper shaft 51 rotates about the center axis BX, the lower shaft 52 also rotates about the center axis BX along with the upper shaft 51.

The steering device 100 includes an upper bracket 8 and a lower bracket 9, the upper bracket 8 being connected to the steering column 3, the lower bracket 9 being disposed at the front side (the lower side) of the upper bracket 8. The steering column 3 is supported by the vehicle body VB through the upper bracket 8 and the lower bracket 9. The upper bracket 8 is connected to the upper column 31. The lower bracket 9 is connected to the lower column 32. In the embodiment, the upper bracket 8 is connected to a support member VBa of the vehicle body VB. The lower bracket 9 is connected to a support member VBb of the vehicle body VB.

When the steering wheel 1 is rotated about the center axis AX by the driver, the steering shaft 2 connected to the steering wheel 1 rotates about the center axis AX. When the steering shaft 2 rotates, the intermediate shaft 5 rotates about the center axis BX. When the intermediate shaft 5 rotates, the input shaft 7 of the steering gear mechanism rotates. The steering gear mechanism includes a rack and pinion mechanism. The rotation force of the intermediate shaft 5 is transmitted to a link mechanism connected to a vehicle wheel through the steering gear mechanism including the input shaft 7. By the operation of the link mechanism, the steering angle of the vehicle wheel is adjusted.

Further, the steering device 100 may include a power steering device that includes an assistant power source like an electric motor assisting the steering operation of the driver.

In the description below, a direction parallel to the center axis AX will be appropriately referred to as an axial direction, a radial direction with respect to the center axis AX will be appropriately referred to as a radial direction, and a rotation direction about the center axis AX will be appropriately referred to as a circumferential direction.

The steering device 100 includes a position adjustment mechanism 10 that adjusts the position of the steering wheel 1, an impact absorbing mechanism 11 that absorbs an impact generated in secondary collision, and a locking mechanism 12 that regulates the operation of the steering wheel 1. The position adjustment mechanism 10 includes a telescopic mechanism 10A that adjusts the position of the steering wheel 1 in the front and rear direction (the axial direction) and a tilting mechanism 10B that adjusts the position of the steering wheel 1 in the up and down direction.

The position adjustment mechanism 10 adjusts the position of the steering wheel 1 in the front and rear direction and the up and down direction by the movement of the steering shaft 2 and the steering column 3. For example, the position of the steering wheel 1 in the front and rear direction and the up and down direction is adjusted in accordance with the body shape or the driving posture of the driver.

The telescopic mechanism 10A includes the steering shaft 2 and the steering column 3 that are able to be moved in a telescopic manner in the axial direction. The steering wheel 1 is connected to one end of the steering shaft 2. The steering shaft 2 and the steering column 3 are lengthened and shortened together. When the steering shaft 2 and the steering column 3 are lengthened and shortened, the position of the steering wheel 1 in the front and rear direction is adjusted. When the steering shaft 2 and the steering column 3 are lengthened, the steering wheel 1 moves backward. When the steering shaft 2 and the steering column 3 are shortened, the steering wheel 1 moves forward.

The tilting mechanism 10B includes a support mechanism that rotatably supports the steering column 3. The tilting mechanism 10B includes the lower bracket 9 and a support member 14, the lower bracket 9 being connected to the steering column 3, the support member 14 supporting the lower bracket 9 through a shaft member 13. The support member 14 is connected to the support member VBb of the vehicle body VB. The lower bracket 9 is rotatable about the center axis J of the shaft member 13. A direction parallel to the center axis J of the shaft member 13 matches the width direction of the vehicle body VB.

When the lower bracket 9 rotates, the steering column 3 connected to the lower bracket 9 also rotates about the center axis J of the shaft member 13. When the steering column 3 rotates, the steering shaft 2 rotates about the center axis J along with the steering column 3. The steering wheel 1 is connected to one end of the steering shaft 2. When the steering shaft 2 rotates about the center axis J, the position of the steering wheel 1 in the up and down direction is adjusted.

The steering wheel 1 is movable in a movable range defined by the telescopic mechanism 10A in the front and rear direction. The steering wheel 1 is movable in a movable range defined by the tilting mechanism 10B in the up and down direction. In the description below, the movable range of the steering wheel 1 defined by the telescopic mechanism 10A in the front and rear direction (the axial direction) will be appropriately referred to as a telescopic movable range, and the position of the steering wheel 1 in the front and rear direction will be appropriately referred to as a telescopic position. Further, in the description below, the movable range of the steering wheel 1 defined by the tilting mechanism 10B in the up and down direction will be appropriately referred to as a tilting movable range, and the position of the steering wheel 1 in the up and down direction will be appropriately referred to as a tilting position.

The impact absorbing mechanism 11 reduces an impact on the driver in the secondary collision. A collision between an automobile and an object such as a different automobile is called a primary collision. A collision between the driver and the steering wheel 1 that is generated after the primary collision is called the secondary collision. In a normal state (a non-collision state), the steering wheel 1 is movable in the telescopic movable range. In the abnormal state (the secondary collision state), the steering wheel 1 moves in the front and rear direction beyond the telescopic movable range. In the secondary collision, the steering wheel 1 moves beyond the telescopic movable range, and thus the impact applied to the driver is reduced.

The impact absorbing mechanism 11 includes the steering shaft 2, the steering column 3, and a collapsible member 15. The steering shaft 2 and the steering column 3 are movable in the axial direction in a telescopic manner, and a collapsible member 15 is disposed between the upper bracket 8 and the support member VBa of the vehicle body VB and is breakable. When an excessive forward force is applied to the steering column 3 due to the secondary collision, the collapsible member 15 is broken. Accordingly, the steering column 3 and the steering wheel 1 move forward beyond the telescopic movable range.

The locking mechanism 12 regulates the rotation of the steering shaft 2 in the rotation direction about the center axis AX to regulate the operation of the steering wheel 1. When the steering wheel 1 is locked while an ignition key does not exist in a key hole, a vehicle theft is prevented.

Figure 2:
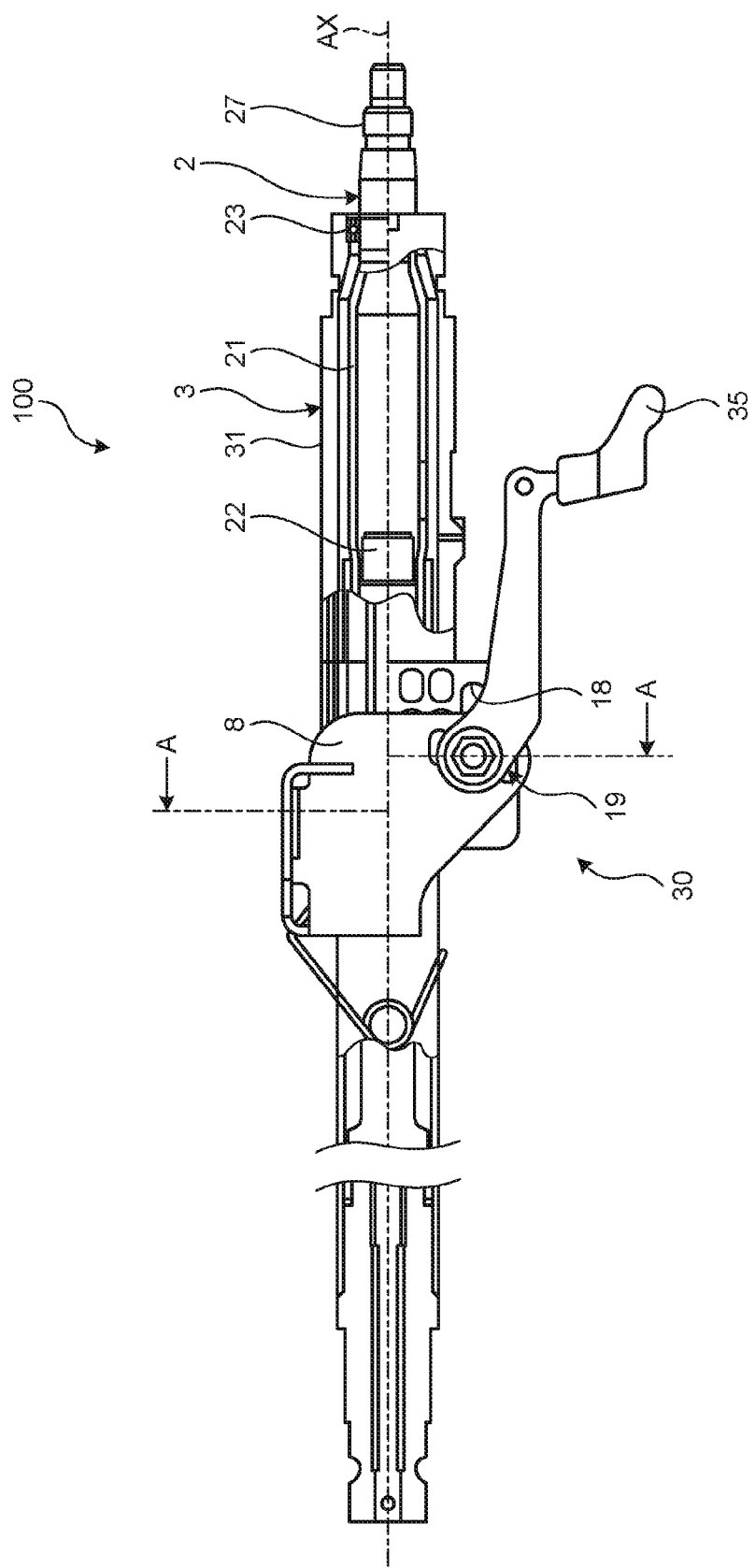
FIG. 2 is a diagram illustrating an example of the steering device according to the first embodiment.
Figure 3:
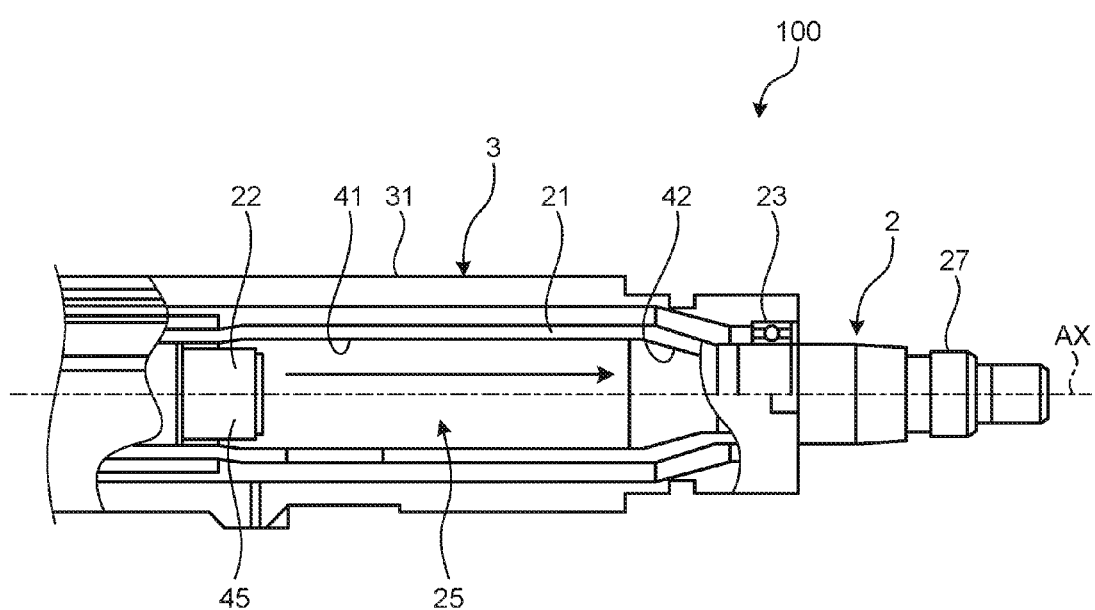
FIG. 3 is a partially enlarged view of FIG. 2.
Figure 4:
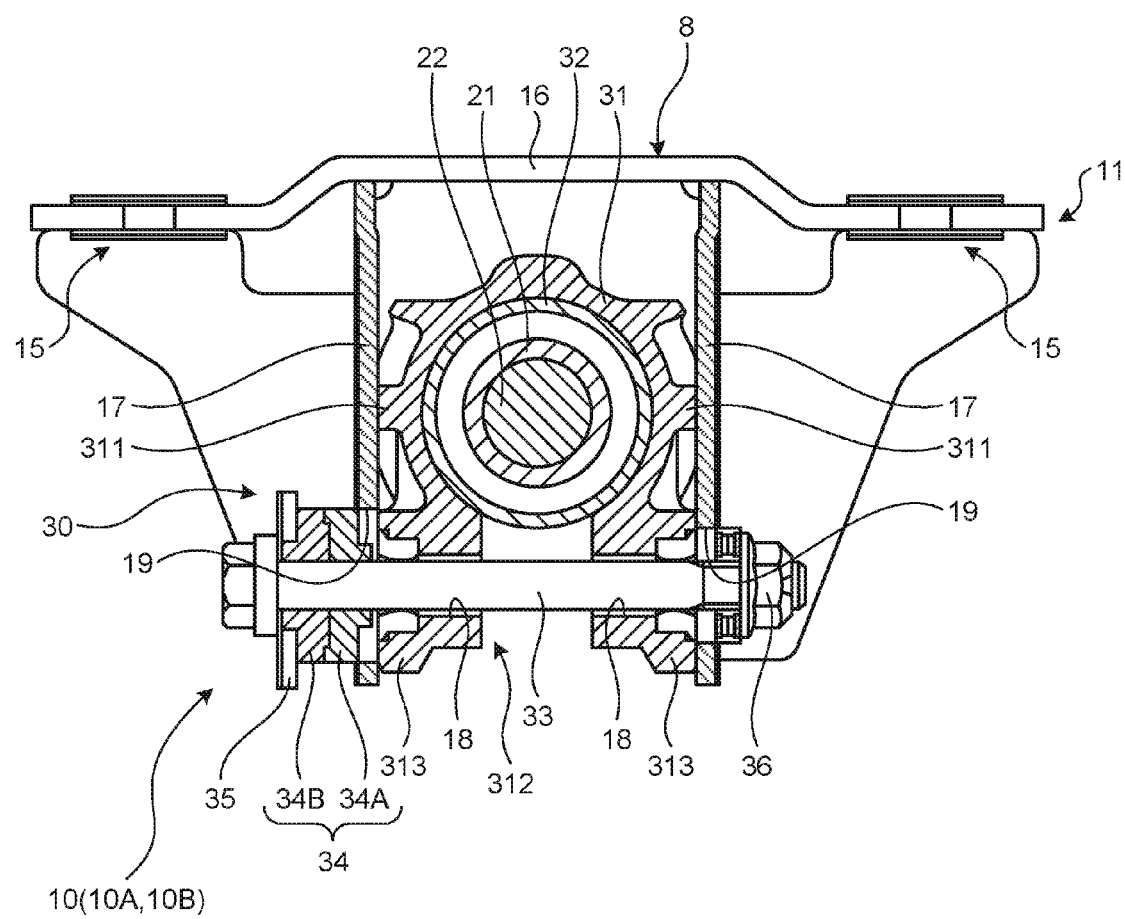
FIG. 4 is a cross-sectional view taken along the line A-A of FIG. 2.
Figure 5:
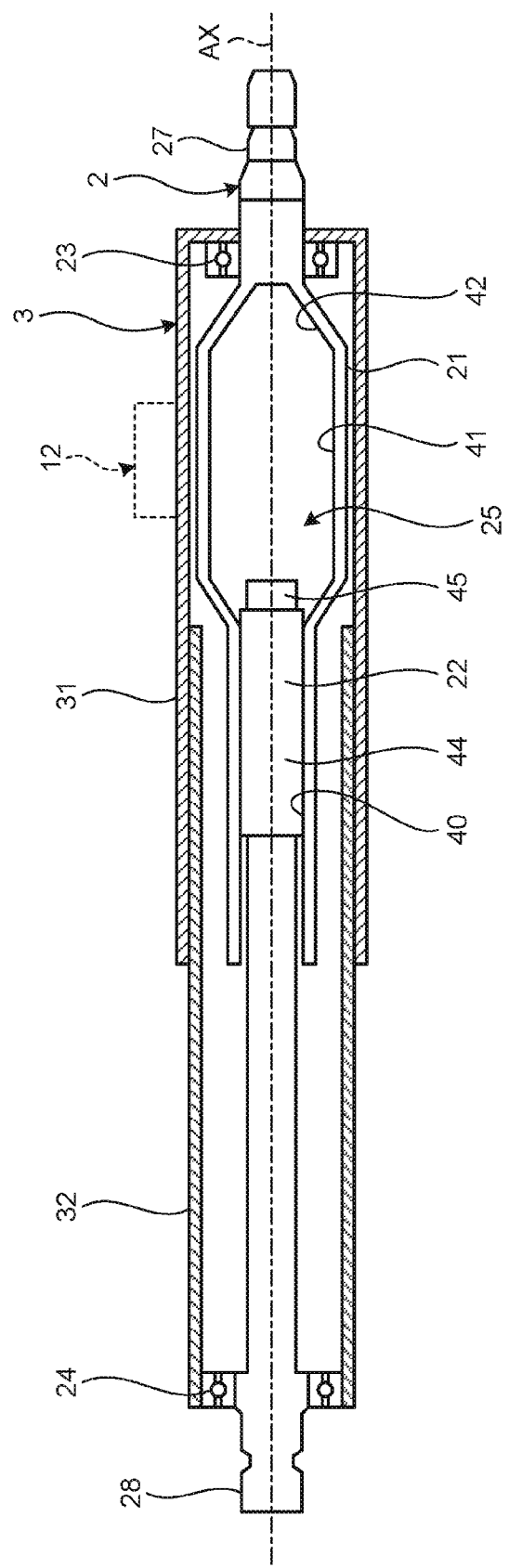
FIG. 5 is a cross-sectional view illustrating an example of a steering shaft and a steering column according to the first embodiment.
Figure 6:
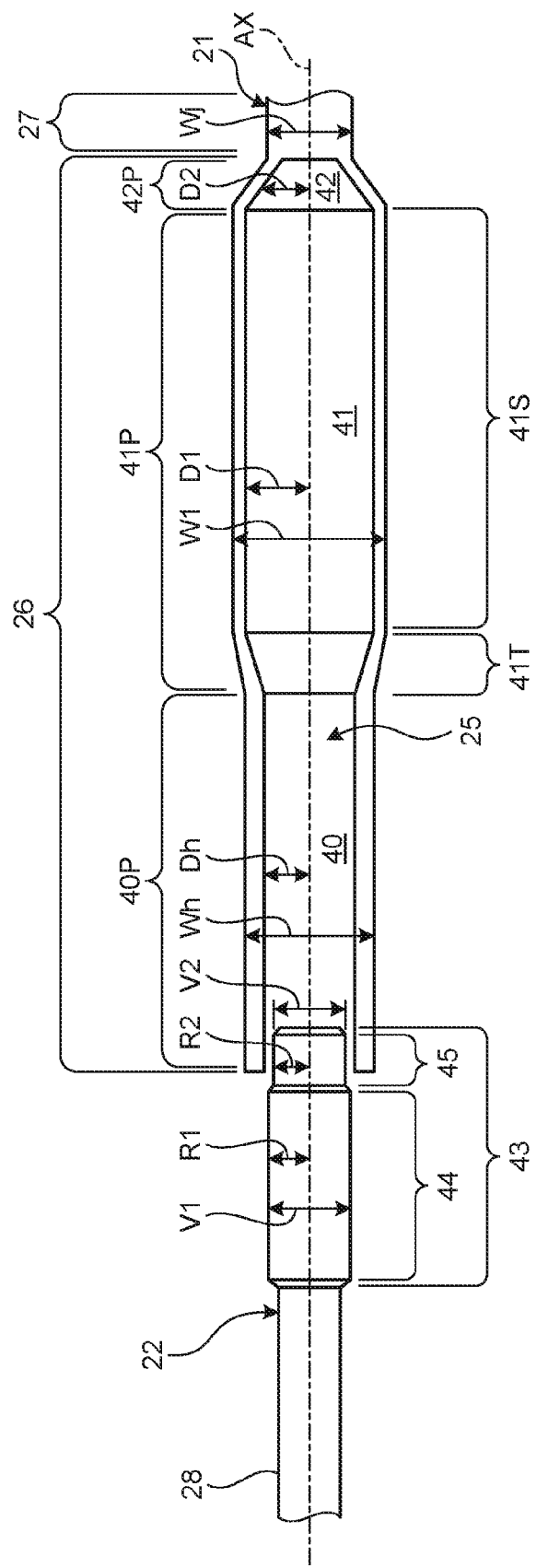
FIG. 6 is a diagram illustrating an example of an upper shaft and a lower shaft according to the first embodiment.

FIG. 2 is a diagram illustrating an example of the steering device 100 according to the embodiment. In FIG. 2, a part of the steering device 100 is indicated by the cross-section. FIG. 3 is a partially enlarged view of FIG. 2. FIG. 4 is a cross-sectional view taken along the line A-A of FIG. 2. FIG. 5 is a cross-sectional view illustrating an example of the steering shaft 2 and the steering column 3 according to the embodiment. FIG. 6 is a diagram illustrating an example of the upper shaft 21 and the lower shaft 22.

The steering shaft 2 includes the upper shaft 21 and the lower shaft 22. The upper shaft 21 includes the shaft portion 27 connected to the steering wheel 1. The lower shaft 22 is relatively movable in the axial direction with respect to the upper shaft 21 and includes the shaft portion 28. In the embodiment, the upper shaft 21 is an outer shaft at least a part of which is disposed around the lower shaft 22. The lower shaft 22 is an inner shaft at least a part of which is disposed inside the upper shaft (the outer shaft) 21. The shaft portion 27 includes a screw portion, a serration portion, and a tapered portion. The shaft portion 27 is disposed outside the steering column 3 in relation to one end of the steering column 3. The shaft portion 28 is disposed outside the steering column 3 in relation to the other end of the steering column 3.

The steering column 3 includes the upper column 31 and the lower column 32. At least a part of the upper column 31 is disposed around the upper shaft 21. The lower column 32 is relatively movable in the axial direction with respect to the upper column 31 and at least part thereof is disposed around the lower shaft 22. In the embodiment, the upper column 31 is an outer column at least a part of which is disposed around the lower column 32. The lower column 32 is an inner column at least a part of which is disposed inside the upper column (the outer column) 31.

The steering column 3 rotatably supports the steering shaft 2 about the center axis AX. A bearing 23 is disposed between the upper shaft 21 and the upper column 31. A bearing 24 is disposed between the lower shaft 22 and the lower column 32. The inner race of the bearing 23 is connected to the upper shaft 21, and the outer race of the bearing 23 is connected to the upper column 31. The inner race of the bearing 24 is connected to the lower shaft 22, and the outer race of the bearing 24 is connected to the lower column 32. The steering column 3 rotatably supports the steering shaft 2 through the bearing 23 and the bearing 24.

The relative positions of the upper shaft 21 and the upper column 31 in the axial direction are substantially fixed. The relative positions of the lower shaft 22 and the lower column 32 in the axial direction are substantially fixed. When the upper shaft 21 and the lower shaft 22 relatively move in the axial direction, the upper column 31 and the lower column 32 relatively move in the axial direction along with the upper shaft 21 and the lower shaft 22.

Next, the position adjustment mechanism 10, the impact absorbing mechanism 11, and a clamping device 30 that fixes (clamps) the upper column 31 and the lower column 32 will be described with reference to FIGS. 2 and 4.

As illustrated in FIGS. 2 and 4, the upper bracket 8 is disposed so as to surround at least a part of the outer column 31. The upper bracket 8 includes a flange portion 16 and two plate members 17. The flange portion 16 is disposed above the outer column 31, and two plate members 17 are disposed below the flange portion 16 so as to sandwich the outer column 31.

The upper column 31 includes an upper contact portion 311 and a distance bracket 312. The upper contact portion 311 is provided so as to contact the plate member 17, and the distance bracket 312 is provided below the upper contact portion 311. The distance bracket 312 includes a lower contact portion 313 that is provided so as to contact the plate member 17.

The distance bracket 312 of the upper column 31 includes an elongated hole 18 that defines the telescopic movable range. The plate member 17 of the upper bracket 8 includes an elongated hole 19 that defines the tilting movable range. The elongated hole 18 is long in the front and rear direction (the axial direction). The elongated hole 19 is long in the up and down direction.

The clamping device 30 is able to fix (clamp) and release (unclamp) the upper column 31 and the lower column 32 to and from the upper bracket 8. The clamping device 30 fixes the upper column 31 and the lower column 32 to the upper bracket 8 by sandwiching the upper column 31 and the lower column 32 from the outside by the two plate members 17.

The clamping device 30 includes the two plate members 17, a rod 33 that is disposed in the elongated hole 18 and the elongated hole 19, a cam locking mechanism 34 that includes a fixed cam 34A and a movable cam 34B disposed outside one plate member 17 of the two plate members 17, an operation lever 35, and a nut 36 that is disposed outside the other plate member 17 of the two plate members 17. The fixed cam 34A, the movable cam 34B, the operation lever 35, and the nut 36 are disposed around the rod 33.

When the operation lever 35 is operated, the plate members 17 of the upper bracket 8 are deformed so as to clamp the upper column 31 and the lower column 32. When the operation lever 35 is operated, the upper column 31 and the lower column 32 are fixed (clamped) and released (unclamped) to and from the upper bracket 8. In the unclamped state, the upper column 31 is movable in the telescopic movable range defined by the elongated hole 18 and the tilting movable range defined by the elongated hole 19. The rod 33 serves as a stopper member. The rod 33 moves inside the elongated hole 18 while being guided by the elongated hole 18. The telescopic movable range is regulated by the rod 33 and the elongated hole 18. Further, the rod 33 moves inside the elongated hole 19 while being guided by the elongated hole 19. The tilting movable range is regulated by the rod 33 and the elongated hole 19. When the upper column 31 moves in the front and rear direction while the rod 33 is guided by the elongated hole 18, the telescopic position of the steering wheel 1 is adjusted. When the upper column 31 moves in the up and down direction while the rod 33 is guided by the elongated hole 19, the tilting position of the steering wheel 1 is adjusted. When the upper column 31 and the lower column 32 are clamped by the operation of the operation lever 35 after the position of the upper column 31 (the steering wheel 1) is adjusted in the unclamped state, the position of the steering wheel 1 is fixed.

The collapsible member 15 of the impact absorbing mechanism 11 is disposed between the vehicle body VB (the support member VBa) and the flange portion 16 of the upper bracket 8. When the steering wheel 1 is subjected to an excessive force due to the secondary collision and is pressed forward, a part of the collapsible member 15 is broken. Due to the breakage, the flange portion 16 of the upper bracket 8 is separated from the collapsible member 15, and the steering column 3 and the steering wheel 1 move forward (i.e., produce a collapse movement) beyond the telescopic movable range. Accordingly, the impact energy of the secondary collision is absorbed.

Next, the steering shaft 2 and the steering column 3 will be mainly described with reference to FIGS. 5 and 6. As described above, the upper shaft 21 is an outer shaft and the lower shaft 22 is an inner shaft. In the description below, the upper shaft 21 will be appropriately referred to as the outer shaft 21, and the lower shaft 22 will be appropriately referred to as the inner shaft 22. Further, in the description below, the upper column 31 will be appropriately referred to as the outer column 31, and the lower column 32 will be appropriately referred to as the inner column 32.

The outer shaft 21 includes a cylindrical portion 26 and the shaft portion 27. The cylindrical portion 26 includes an inner space 25 and is disposed around the center axis AX, and the shaft portion 27 is disposed adjacent to (behind) one side of the cylindrical portion 26. At least a part of the inner shaft 22 is disposed in the inner space 25.

The outer shaft 21 and the inner shaft 22 are spline-fitted to each other. The inner space 25 of the outer shaft 21 includes a spline hole portion 40. A female spline is formed on the inner surface of the spline hole portion 40. The inner space 25 may pass through the outer shaft 21 to the front end side of the outer shaft 21.

The inner space 25 includes a first portion space 41 and a second portion space 42. The first portion space 41 is disposed adjacent to (behind) one side of the spline hole portion 40 in the axial direction, and the second portion space 42 is disposed adjacent to (behind) one side of the first portion space 41 in the axial direction. The distance (radius) D1 between the center axis AX and the inner surface of the first portion space 41 is larger than the distance (radius) Dh between the center axis AX and the inner surface of the spline hole portion 40. The distance (radius) D2 between the center axis AX and the inner surface of the second portion space 42 is smaller than the distance D1 between the center axis AX and the inner surface of the first portion space 41.

That is, the inner diameter of the first portion space 41 is larger than the inner diameter of the spline hole portion 40. The inner diameter of the second portion space 42 is smaller than the inner diameter of the first portion space 41.

In the description below, a part of the cylindrical portion 26 including the first portion space 41 will be appropriately referred to as a large-diameter portion 41P, and a part of the cylindrical portion 26 including the second portion space 42 will be appropriately referred to as a small-diameter portion 42P. Further, in the description below, a part of the cylindrical portion 26 provided with a female spline will be appropriately referred to as a female spline portion 40P.

In the embodiment, the first portion space 41 includes a tapered portion 41T and a straight portion 41S. The inner diameter of the tapered portion 41T gradually increases toward one side in the axial direction from the boundary with the spline hole portion 40. The straight portion 41S is disposed adjacent to one side of the tapered portion 41T, and the inner diameter of the straight portion is uniform. The second portion space 42 is formed so that the inner diameter thereof gradually decreases toward one side in the axial direction from the boundary with the first portion space 41.

The outer diameter Wj of the shaft portion 27 of the outer shaft 21 is smaller than the outer diameter W1 of the large-diameter portion 41P. The bearing 23 supports the shaft portion 27. Further, the outer diameter Wh of the female spline portion 40P is smaller than the outer diameter W1 of the large-diameter portion 41P.

The inner shaft 22 includes a spline shaft portion 43 and the shaft portion 28. The spline shaft portion 43 is spline-fitted to the spline hole portion 40, and the shaft portion 28 is disposed adjacent to (before) the other side of the spline shaft portion 43. The surface of the spline shaft portion 43 is disposed around the center axis AX. The surface of the spline shaft portion 43 is provided with a male spline. The surface of the shaft portion 28 is not provided with a male spline. The shaft portion 28 may be provided with an elongated male spline.

The spline shaft portion 43 includes a first spline shaft portion 44 and a second spline shaft portion 45. The first spline shaft portion 44 includes a synthetic resin surface. The second spline shaft portion 45 is disposed adjacent to (behind) one side of the first spline shaft portion 44 in the axial direction, includes one end (the rear end) of the inner shaft 22, and includes a metal surface. One end of the inner shaft 22 is disposed in the inner space 25. The other end of the inner shaft 22 includes the shaft portion 28 and is disposed outside the inner space 25.

The distance (radius) R2 between the center axis AX and the surface of the second spline shaft portion 45 is smaller than the distance (radius) R1 between the center axis AX and the surface of the first spline shaft portion 44. That is, the outer diameter V2 of the second spline shaft portion 45 is smaller than the outer diameter V1 of the first spline shaft portion 44. The outer diameter of the shaft portion 28 is smaller than the outer diameter V1 of the first spline shaft portion 44.

The spline hole portion 40 and the first spline shaft portion 44 are spline-fitted to each other. The spline hole portion 40 and the second spline shaft portion 45 can be spline-fitted to each other. Accordingly, the outer shaft 21 and the inner shaft 22 are relatively movable in the axial direction. Further, the inner shaft 22 also rotates by the rotation of the outer shaft 21.

In the embodiment, the surface of the first spline shaft portion 44 is formed of synthetic resin. When the spline shaft portion 43 and the spline hole portion 40 are spline-fitted to each other, there is a possibility that rattling is generated, a steering feeling is degraded, or noise is generated during the steering operation due to the clearance between the male spline of the spline shaft portion 43 and the female spline of the spline hole portion 40. For example, in the case where both the surface of the first spline shaft portion 44 and the surface of the spline hole portion 40 are formed of metal and where the clearance between the male spline and the female spline is large, when the steering wheel 1 (the outer shaft 21) is rotated in a certain direction of the circumferential direction and is rotated in the opposite direction, abnormal sound may be generated by the contact between the male spline and the female spline, rattling may be generated between the male spline and the female spline, or a steering feeling may be degraded. Further, in the case where both the surface of the first spline shaft portion 44 and the surface of the spline hole portion 40 are formed of metal and where the clearance between the male spline and the female spline is decreased, the spline-fitting may be difficult, though at least one of the inner shaft 22 and the outer shaft 21 may be slightly bent. As a result, there is a possibility that the spline-fitting is difficult.

In the embodiment, the surface of the first spline shaft portion 44 is formed of synthetic resin softer than metal. For that reason, the generation of rattling, the degradation in steering feeling, and the generation of abnormal sound are suppressed in the steering of the steering shaft 2. Further, since the surface of the first spline shaft portion 44 is formed of synthetic resin, the spline-fitting is smoothly performed even when the clearance between the male spline and the female spline is small.

Figure 7:
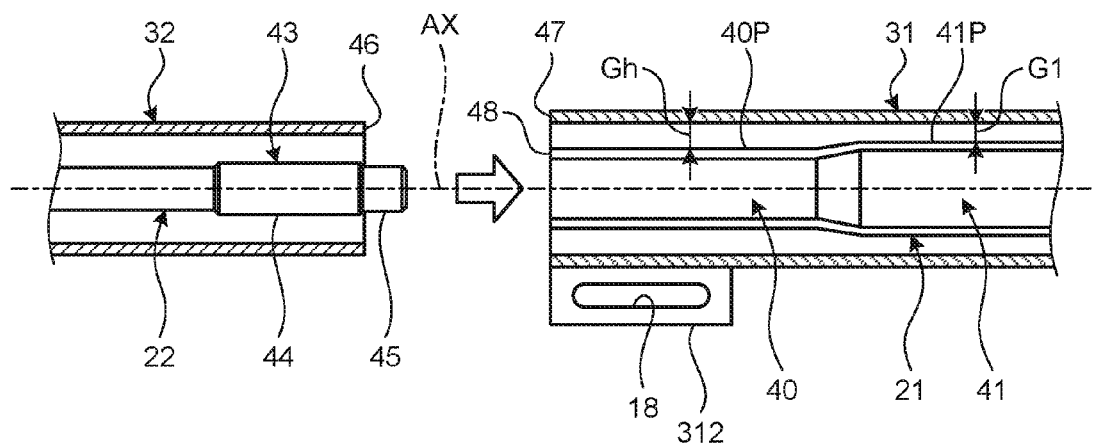
FIG. 7 is a schematic diagram illustrating a relation between an outer shaft and an outer column, and an inner shaft and an inner column according to the first embodiment.

FIG. 7 is a schematic diagram illustrating a relation between the outer shaft 21 and the outer column 31, and the inner shaft 22 and the inner column 32.

The inner column 32 is disposed around the inner shaft 22. The relative positions of the inner shaft 22 and the inner column 32 in the axial direction are substantially fixed.

The outer column 31 is disposed around the outer shaft 21. The relative positions of the outer shaft 21 and the outer column 31 in the axial direction are substantially fixed.

As illustrated in FIG. 7, at least a part of the second spline shaft portion 45 of the inner shaft 22 is disposed outside an end surface 46 of one end of the inner column 32 in the axial direction. In the axial direction, an end surface 47 of the other end of the outer column 31 and an end surface 48 of the other end of the outer shaft 21 are disposed within the same plane. The same plane is a plane orthogonal to the center axis AX.

As described above, the outer diameter Wh of the female spline portion 40P is smaller than the outer diameter W1 of the large-diameter portion 41P. The inner diameter of the outer column 31 is uniform in the axial direction. As illustrated in FIG. 7, the distance G1 between the outer surface of the large-diameter portion 41P and the inner surface of the outer column 31 is smaller than the distance Gh between the outer surface of the female spline portion 40P and the inner surface of the outer column 31.

When the outer shaft 21 and the outer column 31 are coupled to the inner shaft 22 and the inner column 32, one end of the inner shaft 22 is inserted into the inner space 25 of the outer shaft 21 and one end of the inner column 32 is inserted into the outer column 31.

Figure 8:
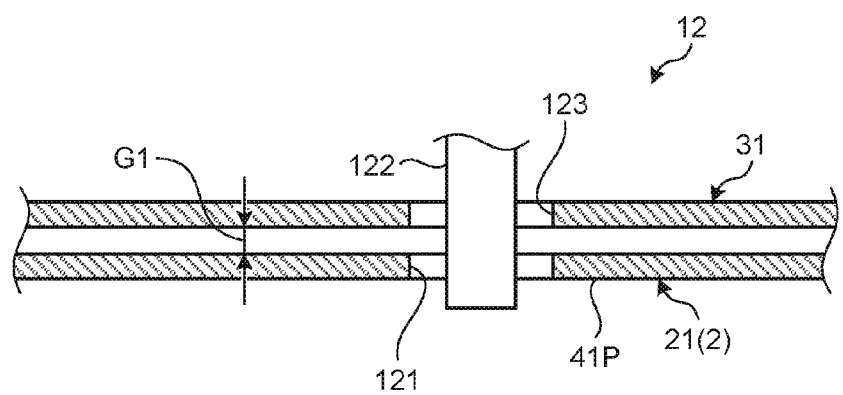
FIG. 8 is a schematic diagram illustrating an example of a locking mechanism according to the first embodiment.

FIG. 8 is a schematic diagram illustrating an example of the locking mechanism 12 according to the embodiment. The locking mechanism 12 includes a locking hole 121 that is formed in the outer shaft 21 of the steering shaft 2, a locking key 122 that is inserted into the locking hole 121, and a hole 123 that is formed in the outer column 31 of the steering column 3 so that the locking key 122 is disposed therein. In the telescopic movable range, the inner shaft 22 is not disposed at a position facing the locking key 122. The locking key 122 is inserted into the locking hole 121 so as to be disposed in both the locking hole 121 and the hole 123. When the locking key 122 contacts the circumferential edge of the locking hole 121, the rotation of the steering shaft 2 is regulated. An example of the locking mechanism is disclosed in Japanese Patent Application Laid-open No. 2002-067975 and Japanese Patent Application Laid-open No. 2009-190680.

It is desirable that the distance between the outer surface of the steering shaft 2 and the inner surface of the steering column 3 is short so that the locked state is not released even when the steering wheel 1 (the steering shaft 2) is forcedly rotated while the locking key 122 is inserted into the locking hole 121. For that reason, in the embodiment, the large-diameter portion 41P is provided in the outer shaft 21 of the steering shaft 2. The locking mechanism 12 (the locking hole 121) is provided in the large-diameter portion 41P having the distance G1 to the inner surface of the steering column 3 (the outer column 31) that is short, and therefore the steering shaft 2 can be stably locked.

Figure 9:
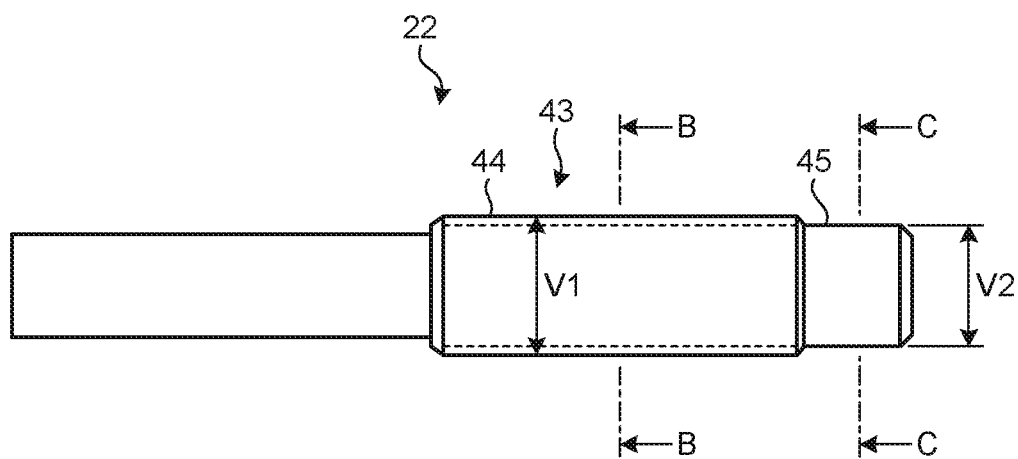
FIG. 9 is a side view illustrating an example of the inner shaft according to the first embodiment.
Figure 10:
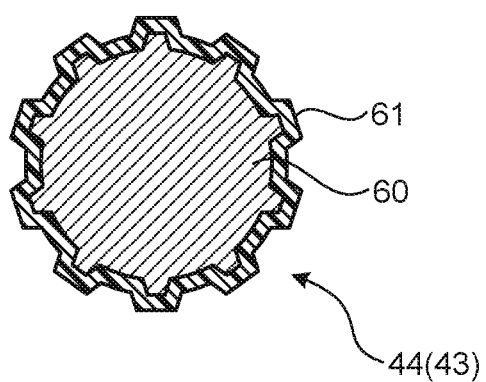
FIG. 10 is a cross-sectional view taken along the line B-B of FIG. 9.
Figure 11:
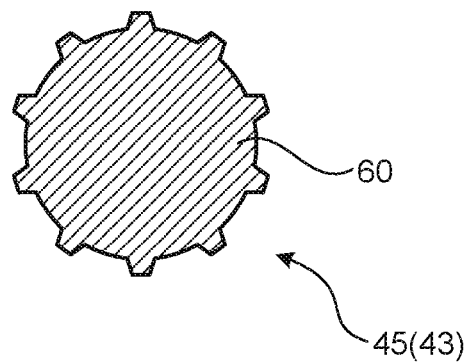
FIG. 11 is a cross-sectional view taken along the line C-C of FIG. 9.

FIG. 9 is a side view illustrating an example of the inner shaft 22 according to the embodiment. FIG. 10 is a cross-sectional view illustrating an example of the first spline shaft portion 44 and corresponds to a cross-sectional view taken along the line B-B of FIG. 9. FIG. 11 is a cross-sectional view illustrating an example of the second spline shaft portion 45 and corresponds to a cross-sectional view taken along the line C-C of FIG. 9.

As illustrated in FIGS. 9, 10, and 11, the spline shaft portion 43 includes a metallic core 60 provided with a male spline. The surface of the first spline shaft portion 44 is the surface of a synthetic resin film 61 formed on the surface of the core 60. The surface of the second spline shaft portion 45 is the surface of the core 60. In the embodiment, the synthetic resin film 61 is formed of, for example, polyamide synthetic resin.

Next, an example of a method for manufacturing the steering device 100 according to the embodiment will be described. As described above by referring to FIGS. 5, 6, and other figures, the outer shaft 21 including the inner space 25 with the spline hole portion 40 is manufactured. That is, the outer shaft 21 including the spline hole portion 40, the first portion space 41, and the second portion space 42 is manufactured. The first portion space 41 is formed adjacent to one side of the spline hole portion 40 in the axial direction. The second portion space 42 is formed adjacent to one side of the first portion space 41 in the axial direction.

In the process of manufacturing the inner shaft 22, the metallic core 60 including the spline shaft portion 43 is first manufactured.

Figure 12:
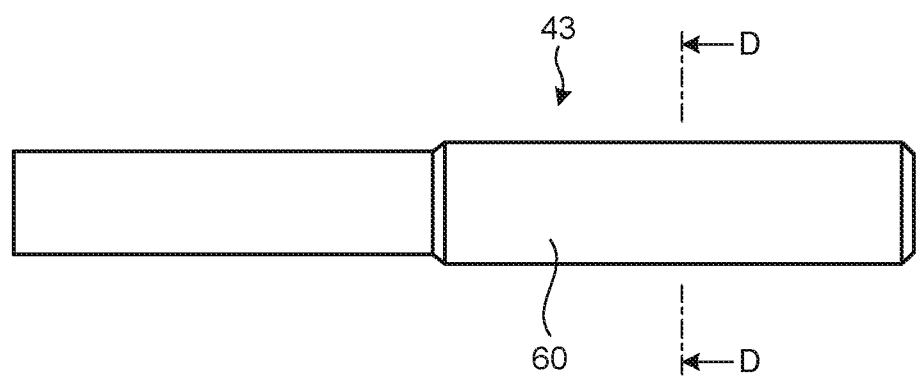
FIG. 12 is a diagram illustrating an example of a method for manufacturing a steering device according to the first embodiment and is a diagram illustrating an example of a core.
Figure 13:
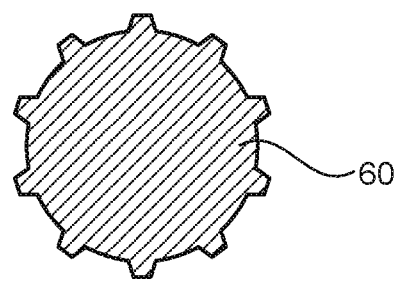
FIG. 13 is a cross-sectional view taken along the line D-D of FIG. 12.

FIGS. 12 and 13 are diagrams illustrating an example of the metallic core 60 including the spline shaft portion 43. FIG. 12 is a side view of the core 60. FIG. 13 is a cross-sectional view taken along the line D-D of FIG. 12. As illustrated in FIG. 12, the spline shaft portion 43 with a male spline is formed. The surface of the spline shaft portion 43 is formed of metal. In the axial direction, the outer diameter of the spline shaft portion 43 is uniform.

Next, the surface of the spline shaft portion 43 is treated so that the synthetic resin film 61 is formed in a part of the surface of the spline shaft portion 43.

In the embodiment, a part of the surface of the spline shaft portion 43 including one end of the core 60 is covered by a mask member 70. When synthetic resin is supplied to the spline shaft portion 43 covered by the mask member 70, the synthetic resin film 61 is formed in a part of the surface of the spline shaft portion 43, and the first spline shaft portion 44 having the surface of synthetic resin is formed. Further, the synthetic resin film 61 is not formed in a part of the spline shaft portion 43 covered by the mask member 70. A part of the spline shaft portion 43 covered by the mask member 70 becomes the second spline shaft portion 45.

Figure 14:
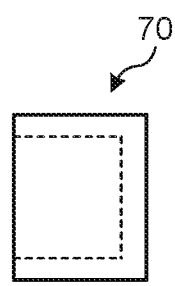
FIG. 14 is a diagram illustrating an example of the method for manufacturing a steering device according to the first embodiment and is a side view illustrating an example of a mask member.
Figure 15:
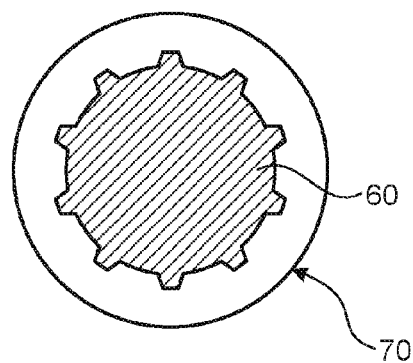
FIG. 15 is a plan view illustrating an example of the mask member according to the first embodiment.

FIG. 14 is a side view illustrating an example of the mask member 70 according to the embodiment. FIG. 15 is a plan view illustrating an example of the mask member 70 according to the embodiment. As illustrated in FIGS. 14 and 15, in the embodiment, the mask member 70 includes a cap member provided with a female spline.

Figure 16:
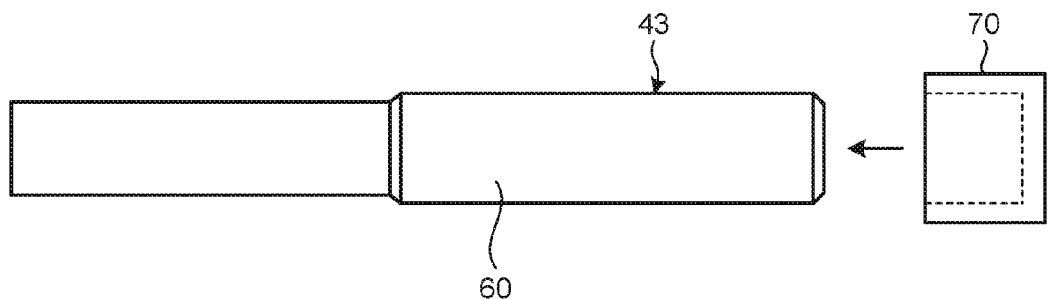
FIG. 16 is a diagram illustrating an example of the method for manufacturing a steering device according to the first embodiment and is a diagram illustrating a state where a part of a spline shaft portion is covered by a cap member.

FIG. 16 is a schematic diagram illustrating an example in which a part of the spline shaft portion 43 is covered by the cap member 70. As illustrated in FIG. 16, a part of the surface of the spline shaft portion 43 including one end of the core 60 is covered by the cap member 70. The cap member 70 includes a female spline engaging with the male spline of the spline shaft portion 43 and can sufficiently cover a part of the surface of the spline shaft portion 43.

Next, synthetic resin is supplied to the surface of the spline shaft portion 43 while a part of the surface of the spline shaft portion 43 is covered by the cap member 70. In the embodiment, the spline shaft portion 43 is immersed into the melted synthetic resin while a part of the surface of the spline shaft portion 43 is covered by the cap member 70.

Figure 17:
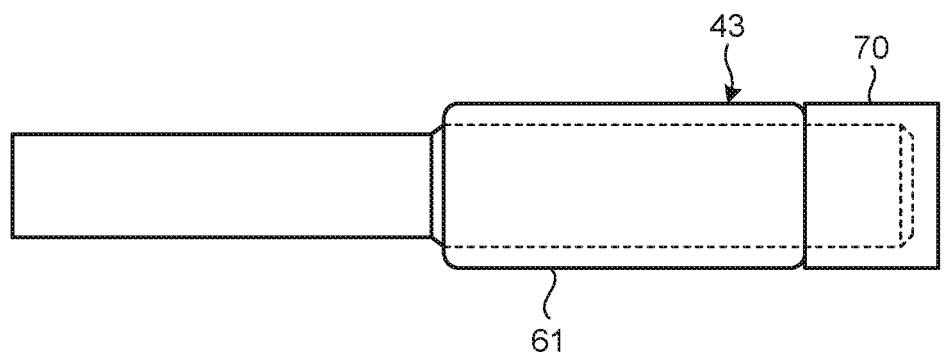
FIG. 17 is a diagram illustrating an example of the method for manufacturing a steering device according to the first embodiment and is a diagram illustrating an example of the spline shaft portion to which synthetic resin is supplied.

FIG. 17 is a schematic diagram illustrating an example of the spline shaft portion 43 immersed into the melted synthetic resin. When the spline shaft portion 43 is immersed into the melted synthetic resin, the synthetic resin film 61 is formed in a part of the surface of the spline shaft portion 43.

Figure 18:
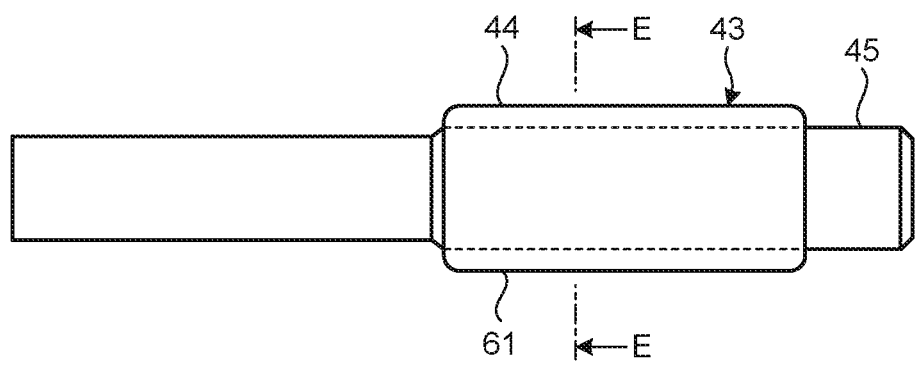
FIG. 18 is a diagram illustrating an example of the method for manufacturing a steering device according to the first embodiment and is a diagram illustrating an example of the spline shaft portion from which the cap member is separated.
Figure 19:
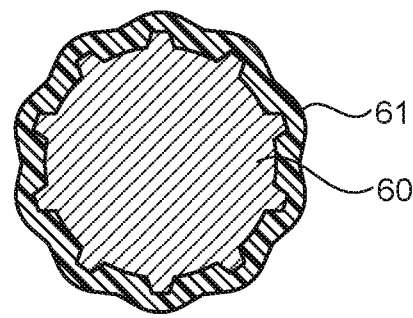
FIG. 19 is a cross-sectional view taken along the line E-E of FIG. 18.

FIG. 18 is a schematic diagram illustrating an example of the spline shaft portion 43 to which the synthetic resin film 61 is provided and from which the cap member 70 is separated. FIG. 19 is a cross-sectional view taken along the line E-E of FIG. 18. As illustrated in FIGS. 18 and 19, the synthetic resin film 61 is not formed in a portion covered by the cap member 70. A portion covered by the cap member 70 becomes the second spline shaft portion 45. A portion provided with the synthetic resin film 61 becomes the first spline shaft portion 44. The spline shaft portion 43 may be immersed into the melted synthetic resin so as to form the synthetic resin film 61, and then the synthetic resin film 61 may be shaped by shaving.

Forming the synthetic resin film 61 makes the outer diameter V1 of the first spline shaft portion 44 larger than the outer diameter V2 of the second spline shaft portion 45. With the above-described process, the inner shaft 22 including the first spline shaft portion 44 and the second spline shaft portion 45 is manufactured. The first spline shaft portion 44 includes a synthetic resin surface. The second spline shaft portion 45 is disposed adjacent to one side of the first spline shaft portion 44 in the axial direction, includes one end of the core 60 disposed in the inner space 25, and includes a metal surface smaller in diameter than the first spline shaft portion 44.

Next, the inner column 32 is disposed around the inner shaft 22. As described above with reference to FIG. 7 and other figures, the inner column 32 is disposed around the inner shaft 22 so that the second spline shaft portion 45 is disposed outside the end surface 46 of one end of the inner column 32. The inner column 32 is disposed around the inner shaft 22 so that the relative position with respect to the inner shaft 22 in the axial direction is substantially fixed.

Further, the outer column 31 is disposed around the outer shaft 21. As described above by referring to FIG. 7 and other figures, the outer column 31 is disposed around the outer shaft 21 so that the end surface 48 of the other end of the outer shaft 21 and the end surface 47 of the other end of the outer column 31 in the axial direction are disposed within the same plane. The outer column 31 is disposed around the outer shaft 21 so that the relative position with respect to the outer shaft 21 in the axial direction is substantially fixed.

Next, the second spline shaft portion 45 is inserted into the inner space 25 of the outer shaft 21 and the spline hole portion 40 and the first spline shaft portion 44 are spline-fitted to each other so that the outer shaft 21 and the inner shaft 22 relatively move in the axial direction. When the second spline shaft portion 45 is inserted into the inner space 25 of the outer shaft 21, the inner column 32 is also inserted into the outer column 31 and the outer column 31 is coupled to the inner column 32.

In the embodiment, the diameter of the second spline shaft portion 45 is smaller than that of the first spline shaft portion 44. Thus, when the inner shaft 22 is inserted into the outer shaft 21, the insertion operation can be smoothly performed in a manner such that the inner shaft 22 is inserted from the second spline shaft portion 45 thereof.

Further, in the embodiment, the second spline shaft portion 45 is not provided with the synthetic resin film 61, and the surface of the second spline shaft portion 45 is formed of metal. For that reason, it is possible to suppress degradation in the state of the surface of the second spline shaft portion 45 even when at least a part of the second spline shaft portion 45 and the outer shaft 21 contact each other during the insertion operation. That is, when the surface of the second spline shaft portion 45 is a synthetic resin surface, the contact between the second spline shaft portion 45 and the outer shaft 21 is likely to cause the damage to the synthetic resin because the synthetic resin is softer than metal. The damage may change (degrade) the state of the synthetic resin surface. Further, the synthetic resin may be cracked from the damaged portion so that the synthetic resin may peel. In the embodiment, since the second spline shaft portion 45 as the insertion front end is not provided with the synthetic resin film, degradation in the state of the surface of the second spline shaft portion 45 is suppressed.

Figure 20:
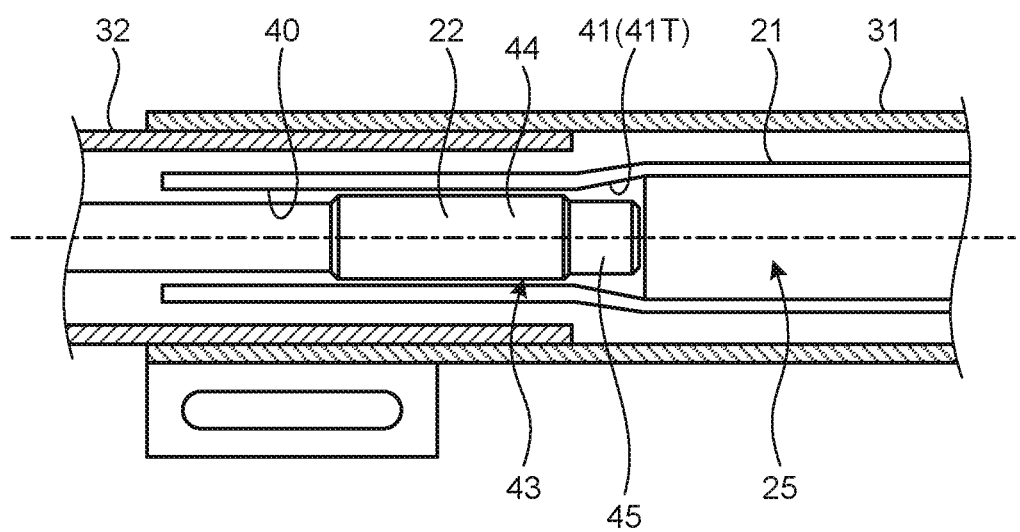
FIG. 20 is a diagram illustrating an example in which the spline shaft portion is disposed in an inner space according to the first embodiment.

FIG. 20 is a diagram illustrating an example of a state where a part of the inner shaft 22 is disposed in the inner space 25. FIG. 20 is a diagram illustrating an example of a state where the spline shaft portion 43 is disposed in the inner space 25. FIG. 20 illustrates a state where the inner shaft 22 is disposed at the rearmost position in the telescopic movable range of the inner shaft 22 with respect to the outer shaft 21 in the axial direction. That is, FIG. 20 illustrates an example in which the relative positions of the outer shaft 21 and the inner shaft 22 are adjusted so that the steering shaft 2 is shortened most in the telescopic movable range. In the description below, a state where the steering shaft 2 is shortened most in the telescopic movable range will be appropriately referred to as the minimal telescopic state.

As illustrated in FIG. 20, in the minimal telescopic state, the second spline shaft portion 45 is disposed in the first portion space 41 and is not disposed in the spline hole portion 40. In the embodiment, the second spline shaft portion 45 is disposed in the tapered portion 41T of the first portion space 41.

In the minimal telescopic state, the entire part of the first spline shaft portion 44 is disposed in the spline hole portion 40. That is, in a state where the second spline shaft portion 45 is disposed in the first portion space 41 and is not spline-fitted to the spline hole portion 40, the first spline shaft portion 44 is disposed in the spline hole portion 40 and is spline-fitted to the spline hole portion 40.

Figure 21:
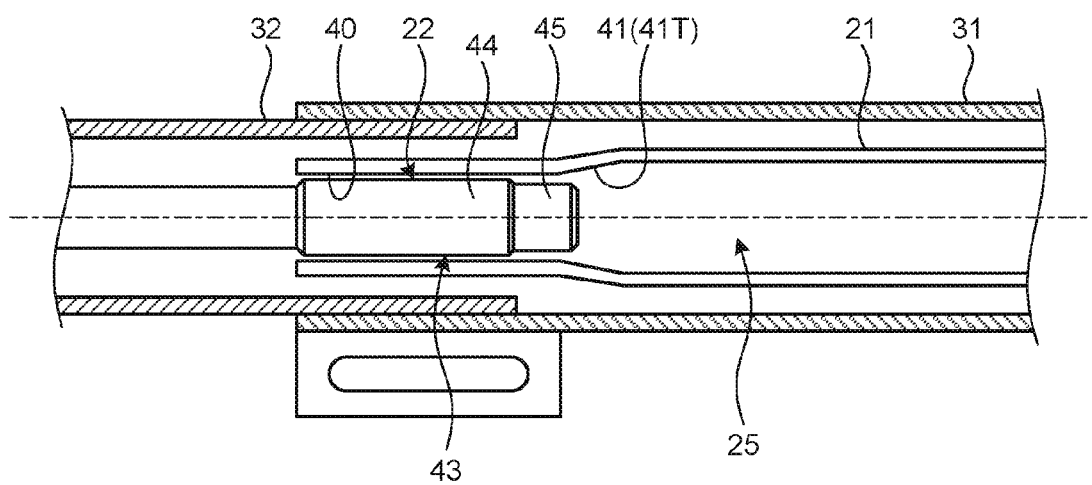
FIG. 21 is a diagram illustrating an example in which the spline shaft portion is disposed in the inner space according to the first embodiment.

FIG. 21 is a diagram illustrating an example of a state where the spline shaft portion 43 is disposed in the inner space 25. FIG. 21 illustrates a state where the inner shaft 22 is disposed at the frontmost position in the telescopic movable range of the inner shaft 22 with respect to the outer shaft 21 in the axial direction. That is, FIG. 21 illustrates an example in which the relative positions of the outer shaft 21 and the inner shaft 22 are adjusted so that the steering shaft 2 is lengthened most in the telescopic movable range. In the description below, a state where the steering shaft 2 is lengthened most in the telescopic movable range will be appropriately referred to as the maximal telescopic state.

As illustrated in FIG. 21, in the maximal telescopic state, at least a part of the second spline shaft portion 45 is disposed in the spline hole portion 40. Further, in the example illustrated in FIG. 21, in the maximal telescopic state, a part of the second spline shaft portion 45 is disposed in the first portion space 41. In the maximal telescopic state, the entire part of the second spline shaft portion 45 may be disposed in the spline hole portion 40.

In the maximal telescopic state, the entire part of the first spline shaft portion 44 is disposed in the spline hole portion 40. That is, in the maximal telescopic state, the first spline shaft portion 44 is spline-fitted to the spline hole portion 40, and at least a part of the second spline shaft portion 45 is spline-fitted to the spline hole portion 40.

In the embodiment, in both the minimal telescopic state and the maximal telescopic state, the entire part of the first spline shaft portion 44 is disposed in the spline hole portion 40. In the embodiment, the first spline shaft portion 44 is continuously disposed inside the spline hole portion 40 in the telescopic movable range.

In the embodiment, when the secondary collision occurs, the steering shaft 2 and the steering column 3 are shortened beyond the telescopic movable range. When the secondary collision occurs, the steering shaft 2 is shortened until at least a part of the second spline shaft portion 45 of the inner shaft 22 is disposed in the second portion space 42 of the outer shaft 21.

As described above, according to the embodiment, since the surface of the first spline shaft portion 44 is formed of synthetic resin, it is possible to suppress the generation of rattling, the degradation in steering feeling, and the generation of abnormal sound caused by the clearance between the male spline of the first spline shaft portion 44 and the female spline of the spline hole portion 40 when the first spline shaft portion 44 and the spline hole portion 40 are spline-fitted to each other.

In the embodiment, the spline shaft portion 43 includes the second spline shaft portion 45 having a diameter smaller than the first spline shaft portion 44. In the process of manufacturing the steering device 100, the second spline shaft portion 45 becomes the insertion front end when the inner shaft 22 is inserted into the inner space 25 of the outer shaft 21. Accordingly, it is possible to smoothly perform the process of manufacturing the steering device 100 including a step of inserting the inner shaft 22 into the outer shaft 21.

Further, the surface of the second spline shaft portion 45 is formed of metal. Damage or marking is not easily formed on the metal surface compared with the synthetic resin surface. For that reason, it is possible to suppress the damage to the surface of the second spline shaft portion 45 and the marking on the surface of the second spline shaft portion 45 even when the second spline shaft portion 45 contacts the outer shaft 21 in the step of inserting the inner shaft 22 into the outer shaft 21. When the state of the surface of the second spline shaft portion 45 is changed (degraded), there is a possibility that a force (a sliding force) generated when relatively moving the outer shaft 21 and the inner shaft 22 in the axial direction so as to move the steering shaft 2 in a telescopic manner is changed (increased). According to the embodiment, since the surface of the second spline shaft portion 45 is formed of metal having strength higher than synthetic resin, a change in surface state is suppressed. Thus, the sliding force is stabilized, and the steering shaft 2 is smoothly moved in a telescopic manner. Accordingly, degradation in performance of the steering device 100 is suppressed.

Further, in the embodiment, since a part of the surface of the metallic core 60 is provided with the synthetic resin film 61, the first spline shaft portion 44 having a large diameter and the second spline shaft portion 45 having a small diameter are smoothly manufactured.

Further, in the embodiment, both the first spline shaft portion 44 and the second spline shaft portion 45 can be spline-fitted to the spline hole portion 40 and hence the spline-fitting state is stabilized.

Further, in the embodiment, the inner space 25 of the outer shaft 21 includes the spline hole portion 40, the first portion space 41, and the second portion space 42. Since the first portion space 41 is provided and the large-diameter portion 41P is provided, the distance G1 between the outer surface of the outer shaft 21 and the inner surface of the outer column 31 can be decreased as described above by referring to FIG. 8. Thus, it is possible to provide the locking mechanism 12 that is not easily released from the locked state even when the steering shaft 2 is forcedly rotated in the locked state.

In the embodiment, the dimensions of the components are adjusted so that the second spline shaft portion 45 is disposed in the first portion space 41 and the first spline shaft portion 44 is disposed in the spline hole portion 40, and therefore the spline-fitting state between the first spline shaft portion 44 and the spline hole portion 40 is stabilized even when the dimension (the spline length) of the spline hole portion 40 of the outer shaft 21 in the axial direction is limited so as to install the additional mechanism of the steering device 100 like the locking mechanism 12.

In the embodiment, a gap is formed between the surface of the second spline shaft portion 45 and the inner surface of the outer shaft 21 in a state where the second spline shaft portion 45 is disposed in the first portion space 41 (the tapered portion 41T). That is, no member contacts the surface of the second spline shaft portion 45 while the second spline shaft portion 45 is disposed in the first portion space 41 (the tapered portion 41T). Even when a temperature increases while no member contacts the surface of the second spline shaft portion 45, the second spline shaft portion 45 is formed of metal that is hard to thermally expand compared with synthetic resin. Thus, even when the second spline shaft portion 45 is moved from the first portion space 41 to the spline hole portion 40, the second spline shaft portion 45 can smoothly move from the first portion space 41 to the spline hole portion 40 because the thermal expansion of the second spline shaft portion 45 is suppressed. That is, a change in sliding force is suppressed even when the steering shaft 2 is lengthened so that the second spline shaft portion 45 moves from the first portion space 41 to the spline hole portion 40 when a temperature increases.

Further, in the embodiment, in the minimal telescopic state, the second spline shaft portion 45 is disposed in the first portion space 41, and the first spline shaft portion 44 is disposed in the spline hole portion 40. When the steering shaft 2 as a product is transported, the steering shaft 2 is often transported in the minimal telescopic state from the viewpoint of the efficiency of the transportation. For example, even when the steering shaft 2 is transported from a low-temperature country in which the product is manufactured to a high-temperature country in which a vehicle is assembled, an increase in sliding force caused by thermal expansion is suppressed in the second spline shaft portion 45 because the second spline shaft portion disposed in the first portion space 41 in the minimal telescopic state is formed of metal that is hard to thermally expand compared with synthetic resin. Further, when the steering shaft 2 is lengthened, both the first spline shaft portion 44 and the second spline shaft portion 45 can be spline-fitted to the spline hole portion 40.

Further, in the embodiment, the first spline shaft portion 44 is continuously disposed inside the spline hole portion 40 in the telescopic movable range. Accordingly, since the spline hole portion 40 exists around the first spline shaft portion 44 at all times, the thermal expansion of the synthetic resin film 61 is suppressed. Further, since the synthetic resin exists between the spline shaft portion 43 and the spline hole portion 40 at all times, it is possible to suppress the generation of rattling, the degradation in steering feeling, and the generation of abnormal sound during the rotation of the steering shaft 2.

Further, in the embodiment, the inner space 25 includes the second portion space 42, and the outer shaft 21 includes the small-diameter portion 42P. Accordingly, the steering shaft 2 can be decreased in size. Further, when the outer shaft 21 is supported by the bearing 23, the shaft portion 27 connected to the small-diameter portion 42P is supported by the bearing 23, and hence an increase in size of the bearing 23 is suppressed.

Further, in the embodiment, the second spline shaft portion 45 is disposed outside one end of the inner column 32 in the axial direction, and the end surface 47 of the other end of the outer column 31 and the end surface 48 of the other end of the outer shaft 21 in the axial direction are disposed within the same plane. Accordingly, the step of inserting the inner shaft 22 into the outer shaft 21 is smoothly performed. Further, the inner shaft 22 and the inner column 32 are sufficiently fitted to the outer shaft 21 and the outer column 31, and hence the spline-fitting rigidity is ensured. Thus, degradation in performance of the steering device 100 is suppressed.

Further, in the process of manufacturing the steering device 100, melted synthetic resin is supplied to the spline shaft portion 43 while a part of the spline shaft portion 43 is covered by the cap member 70. Therefore, the first spline shaft portion 44 with the synthetic resin and the second spline shaft portion 45 without the synthetic resin are smoothly manufactured.

In the embodiment, the upper shaft 21 is the outer shaft, and the lower shaft 22 is the inner shaft. The upper shaft 21 may be the inner shaft, and the lower shaft 22 may be the outer shaft. The same applies to the embodiment below.

In the embodiment, the upper column 31 is the outer column, and the lower column 32 is the inner column. The upper column 31 may be the inner column, and the lower column 32 may be the outer column. The same applies to the embodiment below.

Second Embodiment

A second embodiment will be described. In the description below, the same reference sign will be given to the component equal or identical to the above-described embodiment and the description thereof will be simplified or omitted.

Figure 22:
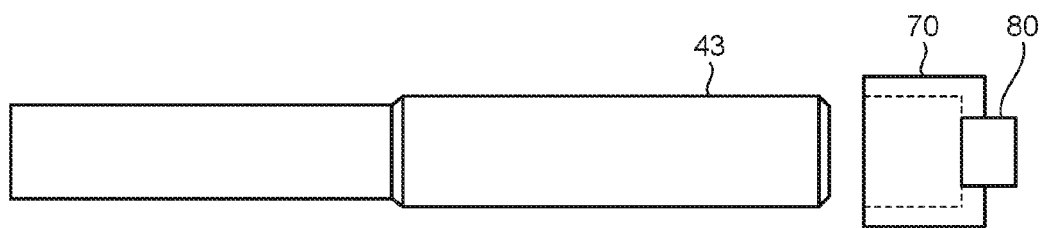
FIG. 22 is a diagram illustrating an example of a method for manufacturing a steering device according to a second embodiment.
Figure 23:
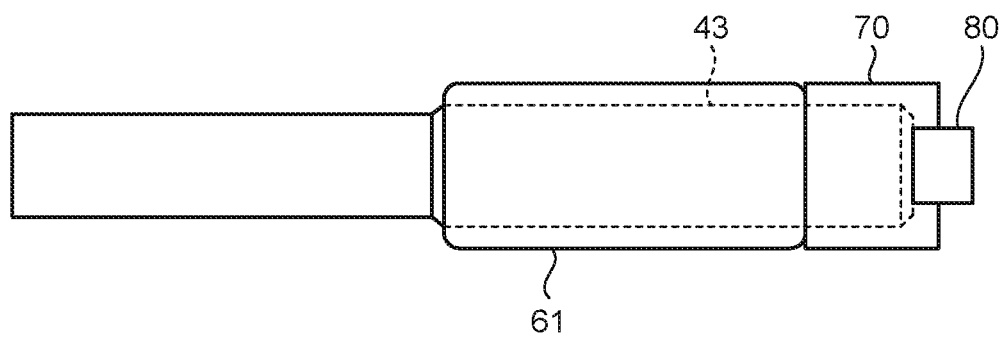
FIG. 23 is a diagram illustrating an example of the method for manufacturing a steering device according to the second embodiment.

FIGS. 22 and 23 are diagrams illustrating an example of a method for manufacturing the steering device 100 according to the embodiment. Similarly to the above-described embodiment, the process of manufacturing the steering device 100 includes a step of immersing the spline shaft portion 43 into liquid synthetic resin while a part of the surface of the spline shaft portion 43 is covered by the cap member 70. As illustrated in FIG. 22, in the embodiment, the cap member 70 is provided with a magnet 80. The cap member 70 and the metallic spline shaft portion 43 are fixed by the magnetic force of the magnet 80 provided to the cap member 70. The spline shaft portion 43 is immersed into the liquid synthetic resin while the cap member 70 and the spline shaft portion 43 are fixed by the magnet 80, and thus the synthetic resin film 61 is formed in a part of the surface of the spline shaft portion 43 as illustrated in FIG. 23.

As described above, according to the embodiment, the separation of the cap member 70 is suppressed while the spline shaft portion is immersed into the synthetic resin. Thus, the synthetic resin film 61 can be provided to the first spline shaft portion 44 and the synthetic resin film 61 cannot be provided to the second spline shaft portion 45.

In the above-described embodiment, the cap member 70 includes the female spline. The cap member (the mask member) 70 may not include the female spline. The same applies to the embodiment below.

When the second spline shaft portion 45 without the synthetic resin film 61 is manufactured, the second spline shaft portion 45 may be formed in a manner such that the synthetic resin film 61 is formed on the entire surface of the spline shaft portion 43 and a part of the synthetic resin film 61 is removed. For example, a part of the synthetic resin film 61 formed on the surface of the spline shaft portion 43 may be removed by cutting. The same applies to the embodiment below.

The surface of the spline shaft portion 43 may be processed by shot blasting before the spline shaft portion 43 is immersed into the melted synthetic resin. The surface of the spline shaft portion 43 is roughened by shot blasting. When the spline shaft portion 43 is immersed into the melted synthetic resin after the shot blasting, the adhesion property between the surface of the spline shaft portion 43 and the synthetic resin film 61 is improved. The same applies to the embodiment below.

Third Embodiment

The third embodiment will be described. In the description below, the same reference sign will be given to the component equal or identical to the above-described embodiment and the description thereof will be simplified or omitted.

Figure 24:
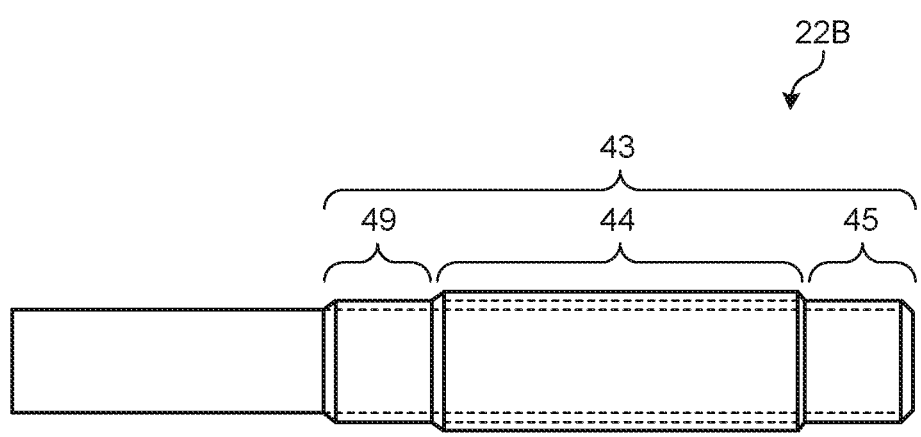
FIG. 24 is a diagram illustrating an example of an inner shaft according to a third embodiment.

FIG. 24 is a diagram illustrating an example of an inner shaft 22B according to the embodiment. As illustrated in FIG. 24, the spline shaft portion 43 includes the first spline shaft portion 44 that includes a synthetic resin surface, the second spline shaft portion 45 that is disposed adjacent to one side of the first spline shaft portion 44 in the axial direction and includes a metal surface, and a third spline shaft portion 49 that is disposed adjacent to the other side of the first spline shaft portion 44 in the axial direction and includes a metal surface. The outer diameter of the third spline shaft portion 49 is smaller than the outer diameter of the first spline shaft portion 44. The outer diameter of the second spline shaft portion 45 is equal to the outer diameter of the third spline shaft portion 49.

In the embodiment, the synthetic resin film 61 is formed only at the center portion of the spline shaft portion 43 in the axial direction and is not formed at both ends of the spline shaft portion 43.

According to the embodiment, the amount of the synthetic resin is decreased. Further, the dimension of the third spline shaft portion 49 in the axial direction is set to be large, and the entire dimension of the spline shaft portion 43 in the axial direction is set to be large. Accordingly, even when the steering shaft 2 is shortened beyond the telescopic movable range, for example, so that the second spline shaft portion 45 is disposed in the second portion space 42 in the secondary collision, the third spline shaft portion 49 can continuously exist in the spline hole portion 40. That is, the spline-fitting state between the spline shaft portion 43 and the spline hole portion 40 is maintained even when the steering shaft 2 is shortened beyond the telescopic movable range. Accordingly, the vehicle can move while being steered by the steering device 100 when the automobile moves after the secondary collision.

Fourth Embodiment

The fourth embodiment will be described. In the description below, the same reference sign will be given to the component equal or identical to the above-described embodiment and the description thereof will be simplified or omitted.

Figure 25:
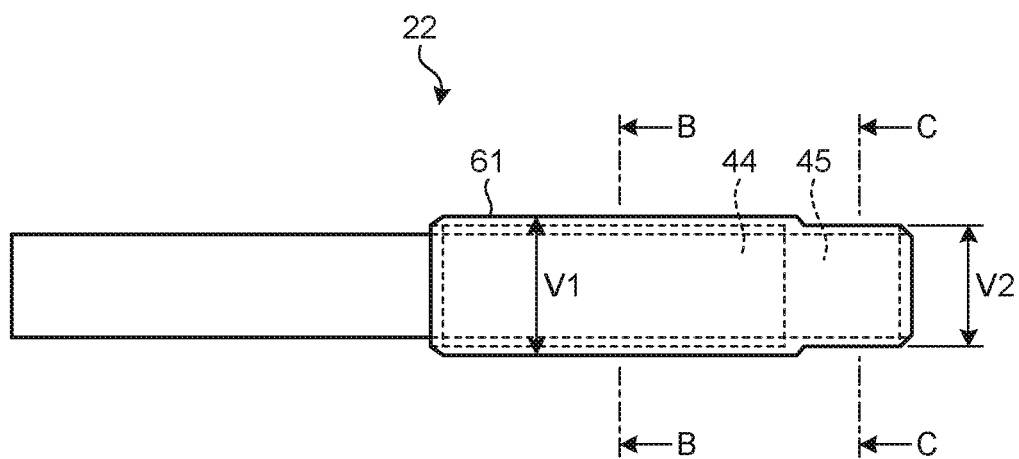
FIG. 25 is a side view illustrating an example of an inner shaft according to a fourth embodiment.
Figure 26:
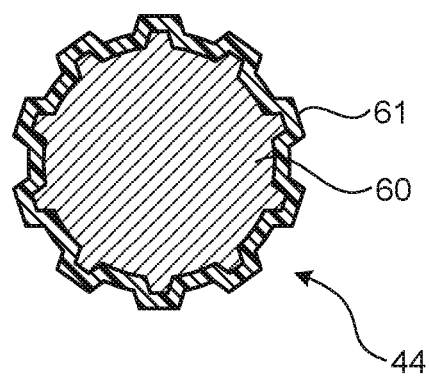
FIG. 26 is a cross-sectional view taken along the line B-B of FIG. 25.
Figure 27:
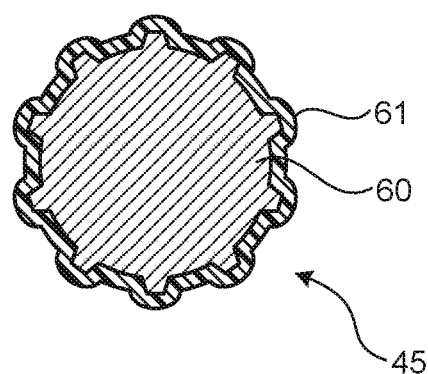
FIG. 27 is a cross-sectional view taken along the line C-C of FIG. 25.

FIG. 25 is a side view illustrating an example of the inner shaft 22 according to the embodiment. FIG. 26 is a cross-sectional view illustrating an example of the first spline shaft portion 44 and corresponds to a cross-sectional view taken along the line B-B of FIG. 25. FIG. 27 is a cross-sectional view illustrating an example of the second spline shaft portion 45 and is a cross-sectional view taken along the line C-C of FIG. 25.

The inner shaft 22 includes the first spline shaft portion 44 that is spline-fitted to the spline hole portion 40, the second spline shaft portion (the shaft portion) 45 that is disposed adjacent to (behind) one side of the first spline shaft portion 44 in the axial direction, and the shaft portion 28 that is disposed adjacent to (before) the other side of the first spline shaft portion 44 in the axial direction. The surface of the first spline shaft portion 44 is disposed around the center axis AX. The surface of the shaft portion 45 is disposed around the center axis AX.

The surface of the first spline shaft portion 44 is provided with a male spline. The surface of the shaft portion 28 is not provided with a male spline. The shaft portion 28 may be provided with an elongated male spline. In the embodiment, the shaft portion 45 includes the second spline shaft portion the surface of which is provided with a male spline.

The first spline shaft portion 44 includes a synthetic resin surface. The second spline shaft portion 45 is disposed adjacent to (behind) one side of the first spline shaft portion 44 in the axial direction, includes one end (the rear end) of the inner shaft 22, and includes a synthetic resin surface. One end of the inner shaft 22 is disposed in the inner space 25. The other end of the inner shaft 22 includes the shaft portion 28 and is disposed outside the inner space 25.

The distance (radius) R2 between the center axis AX and the surface of the second spline shaft portion 45 is smaller than the distance (radius) R1 between the center axis AX and the surface of the first spline shaft portion 44. That is, the outer diameter V2 of the second spline shaft portion 45 is smaller than the outer diameter V1 of the first spline shaft portion 44. The outer diameter of the shaft portion 28 is smaller than the outer diameter V1 of the first spline shaft portion 44.

The spline hole portion 40 and the first spline shaft portion 44 are spline-fitted to each other. The tooth height of the spline of the second spline shaft portion 45 is smaller than that of the spline of the first spline shaft portion 44. The spline hole portion 40 and the second spline shaft portion 45 can be spline-fitted to each other. Accordingly, the outer shaft 21 and the inner shaft 22 are relatively movable in the axial direction. Further, the inner shaft 22 also rotates by the rotation of the outer shaft 21.

As illustrated in FIGS. 25, 26, and 27, the inner shaft 22 includes the metallic core 60 at least a part of which is provided with a male spline. Each of the surface of the first spline shaft portion 44 and the surface of the second spline shaft portion (the shaft portion) 45 is the surface of the synthetic resin film 61 formed on the surface of the core 60. In the embodiment, the synthetic resin film 61 is formed of, for example, polyamide synthetic resin.

Next, an example of a method for manufacturing the steering device 100 according to the embodiment will be described. As described above by referring to FIGS. 5, 6, and other figures, the outer shaft 21 including the inner space 25 with the spline hole portion 40 is manufactured. That is, the outer shaft 21 including the spline hole portion 40, the first portion space 41, and the second portion space 42 is manufactured. The first portion space 41 is formed adjacent to one side of the spline hole portion 40 in the axial direction. The second portion space 42 is formed adjacent to one side of the first portion space 41 in the axial direction.

In the process of manufacturing the inner shaft 22, the metallic core 60 including the spline shaft portion 43 is first manufactured.

As illustrated in FIGS. 12 and 13, the core 60 including the spline shaft portion 43 with the surface disposed around the center axis AX is manufactured. The spline shaft portion 43 includes a male spline. The surface of the spline shaft portion 43 is formed of metal. The outer diameter of the spline shaft portion 43 is uniform in the axial direction.

Next, a partial portion 45B of the spline shaft portion 43 in the axial direction is processed, the partial portion 45B including one end of the core 60. The one end of the core 60 is the end of the inner shaft 22 disposed in the inner space 25.

In the embodiment, the front end of the spline of the partial portion 45B is removed by cutting. The partial portion 45B of the spline shaft portion 43 including the spline from which the front end is removed becomes the second spline shaft portion 45. A partial portion 44B of the spline shaft portion 43 that is not processed by cutting becomes the first spline shaft portion 44.

Figure 28:
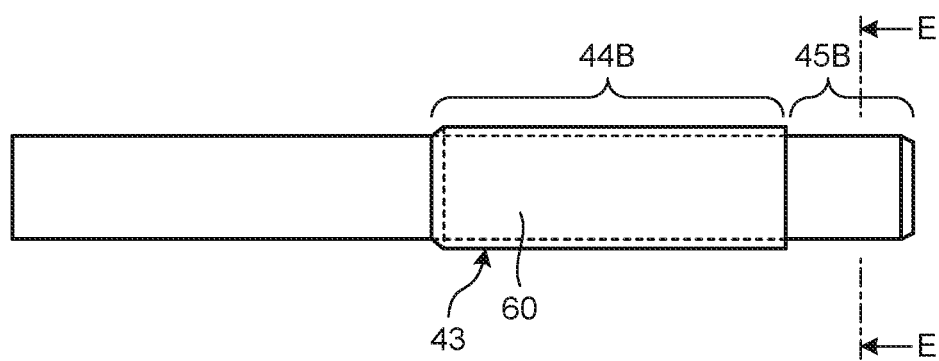
FIG. 28 is a diagram illustrating an example of a method for manufacturing a steering device according to the fourth embodiment and is a diagram illustrating an example of a core.
Figure 29:
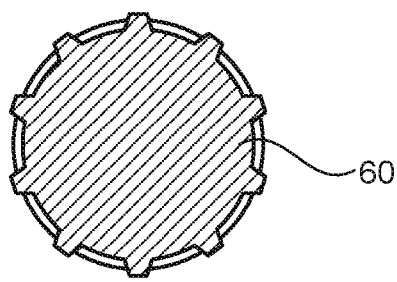
FIG. 29 is a cross-sectional view taken along the line E-E of FIG. 28.
Figure 30:
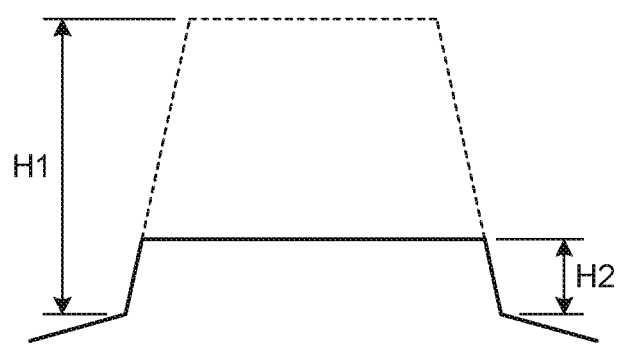
FIG. 30 is a diagram illustrating an example of the method for manufacturing a steering device according to the fourth embodiment and is a diagram illustrating an example of a tooth height of a spline.

FIG. 28 is a side view of the core 60 subjected to cutting. FIG. 29 is a cross-sectional view taken along the line E-E of FIG. 28. FIG. 30 is an enlarged view of the spline of the partial portion 45B.

In FIG. 30, the dimension H1 indicates the tooth height of the spline of the partial portion 44B (the first spline shaft portion 44). The dimension H2 indicates the tooth height of the spline of the partial portion 45B (the second spline shaft portion 45).

In this way, when a part of the spline shaft portion 43 is cut, the partial portion 44B including the spline of the tooth height H1 and the partial portion 45B including the spline of the tooth height H2 are formed. The distance (the radius of the partial portion 45B) between the center axis AX and the surface of the partial portion 45B is smaller than the distance (the radius of the partial portion 44B) between the center axis AX and the surface of the partial portion 44B. In the description below, the partial portion 44B will be appropriately referred to as the large-diameter portion 44B, and the partial portion 45B will be appropriately referred to as the small-diameter portion 45B. In the embodiment, the small-diameter portion 45B is formed from the spline shaft portion 43 by cutting.

After the small-diameter portion 45B is formed, synthetic resin is supplied to the large-diameter portion 44B and the small-diameter portion 45B of the core 60. In the embodiment, the large-diameter portion 44B and the small-diameter portion 45B are immersed into the melted synthetic resin.

Figure 31:
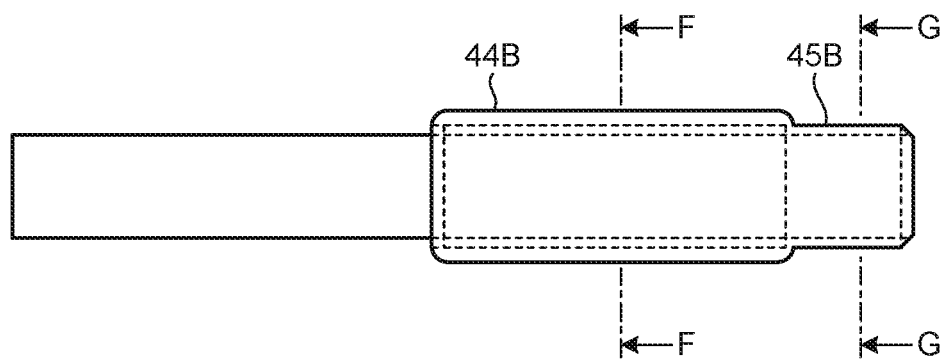
FIG. 31 is a diagram illustrating an example of the method for manufacturing a steering device according to the fourth embodiment and is a diagram illustrating an example of an inner shaft to which synthetic resin is supplied.
Figure 32:
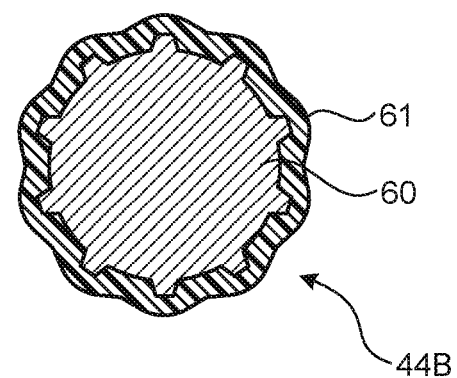
FIG. 32 is a cross-sectional view taken along the line F-F of FIG. 31.
Figure 33:
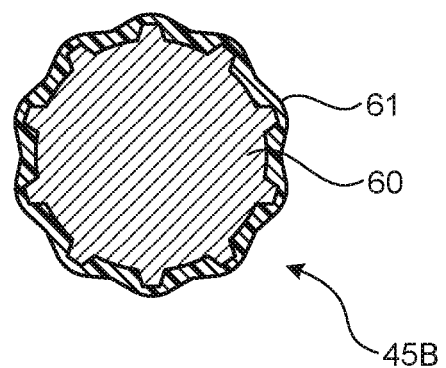
FIG. 33 is a cross-sectional view taken along the line G-G of FIG. 31.

FIG. 31 is a schematic diagram illustrating an example of the large-diameter portion 44B and the small-diameter portion 45B immersed into the melted synthetic resin. FIG. 32 is a cross-sectional view taken along the line F-F of FIG. 31. FIG. 33 is a cross-sectional view taken along the line G-G of FIG. 31.

The large-diameter portion 44B and the small-diameter portion 45B are immersed into the melted synthetic resin, and thus the synthetic resin film 61 of each of the surface of the large-diameter portion 44B and the surface of the small-diameter portion 45B is formed.

After the synthetic resin film 61 is formed in a manner such that the large-diameter portion 44B and the small-diameter portion 45B are immersed into the melted synthetic resin, the synthetic resin film 61 is shaped by shaving. With the above-described process, the inner shaft 22 including the first spline shaft portion 44 and the second spline shaft portion (the shaft portion) 45 is manufactured. The first spline shaft portion 44 includes the synthetic resin surface. The second spline shaft portion 45 is disposed adjacent to one side of the first spline shaft portion 44 in the axial direction and includes the synthetic resin surface.

Next, the inner column 32 is disposed around the inner shaft 22. As described above by referring to FIG. 7 and other figures, the inner column 32 is disposed around the inner shaft 22 so that the second spline shaft portion 45 is disposed outside the end surface 46 of one end of the inner column 32. The inner column 32 is disposed around the inner shaft 22 so that the relative position with respect to the inner shaft 22 in the axial direction is substantially fixed.

Further, the outer column 31 is disposed around the outer shaft 21. As described above by referring to FIG. 7 and other figures, the outer column 31 is disposed around the outer shaft 21 so that the end surface 48 of the other end of the outer shaft 21 and the end surface 47 of the other end of the outer column 31 in the axial direction are disposed within the same plane. The outer column 31 is disposed around the outer shaft 21 so that the relative position with respect to the outer shaft 21 in the axial direction is substantially fixed.

Next, the second spline shaft portion 45 and the first spline shaft portion 44 are inserted into the inner space 25 of the outer shaft 21, and the spline hole portion 40 and the first spline shaft portion 44 are spline-fitted to each other so that the outer shaft 21 and the inner shaft 22 relatively move in the axial direction. When the second spline shaft portion 45 is inserted into the inner space 25 of the outer shaft 21, the inner column 32 is also inserted into the outer column 31, and the outer column 31 and the inner column 32 are coupled to each other.

In the embodiment, the diameter of the second spline shaft portion 45 is smaller than that of the first spline shaft portion 44. Thus, when the inner shaft 22 is inserted into the outer shaft 21, the insertion operation can be smoothly performed in a manner such that the inner shaft 22 is inserted from the second spline shaft portion 45.

Further, since the second spline shaft portion 45 has a small diameter, it is possible to suppress a contact between the second spline shaft portion 45 and at least a part of the outer shaft 21 during the insertion operation. Thus, degradation in the state of the surface of the second spline shaft portion 45 is suppressed. When the synthetic resin of the surface of the second spline shaft portion 45 is damaged by the contact between the second spline shaft portion 45 and the outer shaft 21, there is a possibility that the state of the synthetic resin surface is changed (degraded) due to the damage. Further, there is a possibility that the synthetic resin is cracked from the damaged portion so that the synthetic resin peels. In the embodiment, since the second spline shaft portion 45 as the insertion front end has a small diameter, the contact between the second spline shaft portion 45 and the outer shaft 21 is suppressed, and hence degradation in the state of the surface of the second spline shaft portion 45 is suppressed.

As illustrated in FIG. 20, in the minimal telescopic state, the second spline shaft portion 45 is disposed in the first portion space 41 and is not disposed in the spline hole portion 40. In the embodiment, the second spline shaft portion 45 is disposed in the tapered portion 41T of the first portion space 41.

In the minimal telescopic state, the entire part of the first spline shaft portion 44 is disposed in the spline hole portion 40. That is, in a state where the second spline shaft portion 45 is disposed in the first portion space 41 and is not spline-fitted to the spline hole portion 40, the first spline shaft portion 44 is disposed in the spline hole portion 40 and is spline-fitted to the spline hole portion 40.

As illustrated in FIG. 21, in the maximal telescopic state, at least a part of the second spline shaft portion 45 is disposed in the spline hole portion 40. Further, in the example illustrated in FIG. 21, in the maximal telescopic state, a part of the second spline shaft portion 45 is disposed in the first portion space 41. In the maximal telescopic state, the entire part of the second spline shaft portion 45 may be disposed in the spline hole portion 40.

In the maximal telescopic state, the entire part of the first spline shaft portion 44 is disposed in the spline hole portion 40. That is, in the maximal telescopic state, the first spline shaft portion 44 is spline-fitted to the spline hole portion 40, and at least a part of the second spline shaft portion 45 is spline-fitted to the spline hole portion 40.

In the embodiment, in both the minimal telescopic state and the maximal telescopic state, the entire part of the first spline shaft portion 44 is disposed in the spline hole portion 40. In the embodiment, the first spline shaft portion 44 is continuously disposed inside the spline hole portion 40 in the telescopic movable range.

In the embodiment, when the secondary collision occurs, the steering shaft 2 and the steering column 3 are shortened beyond the telescopic movable range. When the secondary collision occurs, the steering shaft 2 is shortened until at least a part of the second spline shaft portion 45 of the inner shaft 22 is disposed in the second portion space 42 of the outer shaft 21.

As described above, according to the embodiment, since the surface of the first spline shaft portion 44 is formed of the synthetic resin, it is possible to suppress the generation of rattling, the degradation in steering feeling, and the generation of abnormal sound caused by the clearance between the male spline of the first spline shaft portion 44 and the female spline of the spline hole portion 40 when the first spline shaft portion 44 and the spline hole portion 40 are spline-fitted to each other.

In the embodiment, the inner shaft 22 includes the second spline shaft portion (the shaft portion) 45 having a diameter smaller than the first spline shaft portion 44. In the process of manufacturing the steering device 100, the second spline shaft portion 45 becomes the insertion front end when the inner shaft 22 is inserted into the inner space 25 of the outer shaft 21. Accordingly, it is possible to smoothly perform the process of manufacturing the steering device 100 including the step of inserting the inner shaft 22 into the outer shaft 21.

Further, the second spline shaft portion 45 has a small diameter. For that reason, it is possible to suppress the contact between the second spline shaft portion 45 and the outer shaft 21 in the step of inserting the inner shaft 22 into the outer shaft 21. When the state of the surface of the second spline shaft portion 45 is changed (degraded) due to the contact between the second spline shaft portion 45 and the outer shaft 21, there is a possibility that a force (a sliding force) generated when relatively moving the outer shaft 21 and the inner shaft 22 in the axial direction so as to move the steering shaft 2 in a telescopic manner is changed (increased). According to the embodiment, a change in the state of the surface of the second spline shaft portion 45 is suppressed. Thus, the sliding force is stabilized and the steering shaft 2 is smoothly moved in a telescopic manner. Accordingly, degradation in performance of the steering device 100 is suppressed.

Further, in the embodiment, the metallic core 60 including the large-diameter portion 44B and the small-diameter portion 45B is manufactured, and then the synthetic resin is supplied to each of the large-diameter portion 44B and the small-diameter portion 45B. Therefore, the first spline shaft portion 44 having a large diameter and the second spline shaft portion 45 having a small diameter, both of which include the synthetic resin film 61, are smoothly manufactured.

Further, in the embodiment, the male spline of the first spline shaft portion 44 and the female spline of the spline hole portion 40 can sufficiently engage with each other. The male spline of the second spline shaft portion 45 and the female spline of the spline hole portion 40 can slightly engage with each other. Both the first spline shaft portion 44 and the second spline shaft portion 45 can be spline-fitted to the spline hole portion 40 and hence the spline-fitting state is stabilized.

Further, in the embodiment, the inner space 25 of the outer shaft 21 includes the spline hole portion 40, the first portion space 41, and the second portion space 42. Since the first portion space 41 is provided and the large-diameter portion 41P is provided, the distance G1 between the outer surface of the outer shaft 21 and the inner surface of the outer column 31 can be decreased as described above by referring to FIG. 8. Thus, it is possible to provide the locking mechanism 12 that is not easily released from the locked state even when the steering shaft 2 is forcedly rotated in the locked state.

In the embodiment, the dimensions of the components are adjusted so that the second spline shaft portion 45 is disposed in the first portion space 41 and the first spline shaft portion 44 is disposed in the spline hole portion 40, and therefore the spline-fitting state between the first spline shaft portion 44 and the spline hole portion 40 is stabilized even when the dimension (the spline length) of the spline hole portion 40 of the outer shaft 21 in the axial direction is limited so as to install the additional mechanism of the steering device 100 like the locking mechanism 12.

In the embodiment, a gap is formed between the surface of the second spline shaft portion 45 and the inner surface of the outer shaft 21 in a state where the second spline shaft portion 45 is disposed in the first portion space 41 (the tapered portion 41T). That is, no member contacts the surface of the second spline shaft portion 45 while the second spline shaft portion 45 is disposed in the first portion space 41 (the tapered portion 41T). Even when a temperature increases while no member contacts the surface of the second spline shaft portion 45, the outer diameter of the second spline shaft portion 45 including the thermally expanded synthetic resin is smaller than the outer diameter of the first spline shaft portion 44 because the second spline shaft portion 45 has a small diameter. Thus, even when the second spline shaft portion 45 is moved from the first portion space 41 to the spline hole portion 40, the second spline shaft portion 45 can be smoothly moved from the first portion space 41 to the spline hole portion 40. That is, even when the steering shaft 2 is lengthened so that the second spline shaft portion 45 moves from the first portion space 41 to the spline hole portion 40 when a temperature increases, a change in sliding force is suppressed.

Further, in the embodiment, in the minimal telescopic state, the second spline shaft portion 45 is disposed in the first portion space 41, and the first spline shaft portion 44 is disposed in the spline hole portion 40. When the steering shaft 2 as a product is transported, the steering shaft 2 is often transported in the minimal telescopic state from the viewpoint of the efficiency of the transportation. For example, even when the steering shaft 2 is transported from a low-temperature country in which the product is manufactured to a high-temperature country in which a vehicle is assembled, the second spline shaft portion 45 disposed in the first portion space 41 has a small diameter in the minimal telescopic state. Then, even when the synthetic resin of the second spline shaft portion 45 is thermally expanded, the outer diameter of the second spline shaft portion 45 is smaller than the outer diameter of the first spline shaft portion 44. For that reason, an increase in sliding force caused by the thermal expansion is suppressed. Further, when the steering shaft 2 is lengthened, both the first spline shaft portion 44 and the second spline shaft portion 45 can be spline-fitted to the spline hole portion 40.

Further, in the embodiment, the first spline shaft portion 44 is continuously disposed inside the spline hole portion 40 in the telescopic movable range. Accordingly, since the spline hole portion 40 exists around the first spline shaft portion 44 at all times, the thermal expansion of the synthetic resin film 61 is suppressed. Further, since the synthetic resin exists between the first spline shaft portion 44 and the spline hole portion 40 at all times, the generation of rattling, the degradation in steering feeling, and the generation of abnormal sound caused by the rotation of the steering shaft 2 are suppressed.

Further, in the embodiment, the inner space 25 includes the second portion space 42 and the outer shaft 21 includes the small-diameter portion 42P. Accordingly, the steering shaft 2 can be decreased in size. Further, when the outer shaft 21 is supported by the bearing 23, the shaft portion 27 connected to the small-diameter portion 42P is supported by the bearing 23, and hence an increase in size of the bearing 23 is suppressed.

Further, in the embodiment, the second spline shaft portion 45 is disposed outside one end of the inner column 32 in the axial direction and the end surface 47 of the other end of the outer column 31 and the end surface 48 of the other end of the outer shaft 21 in the axial direction are disposed within the same plane. Accordingly, the step of inserting the inner shaft 22 into the outer shaft 21 is smoothly performed. Further, the inner shaft 22 and the inner column 32 are sufficiently fitted to the outer shaft 21 and the outer column 31, and hence the spline-fitting rigidity is ensured. Thus, degradation in performance of the steering device 100 is suppressed.

In the embodiment, the upper shaft 21 is the outer shaft, and the lower shaft 22 is the inner shaft. The upper shaft 21 may be the inner shaft, and the lower shaft 22 may be the outer shaft. The same applies to the embodiment below.

In the embodiment, the upper column 31 is the outer column, and the lower column 32 is the inner column. The upper column 31 may be the inner column, and the lower column 32 may be the outer column. The same applies to the embodiment below.

Fifth Embodiment

The fifth embodiment will be described. In the description below, the same reference sign will be given to the component equal or identical to the above-described embodiment and the description thereof will be simplified or omitted.

In the embodiment, an example in which a shaft portion 450 is the cylindrical portion without a spline is described. Hereinafter, an example of a method for manufacturing an inner shaft 220 according to the embodiment will be described.

Figure 34:
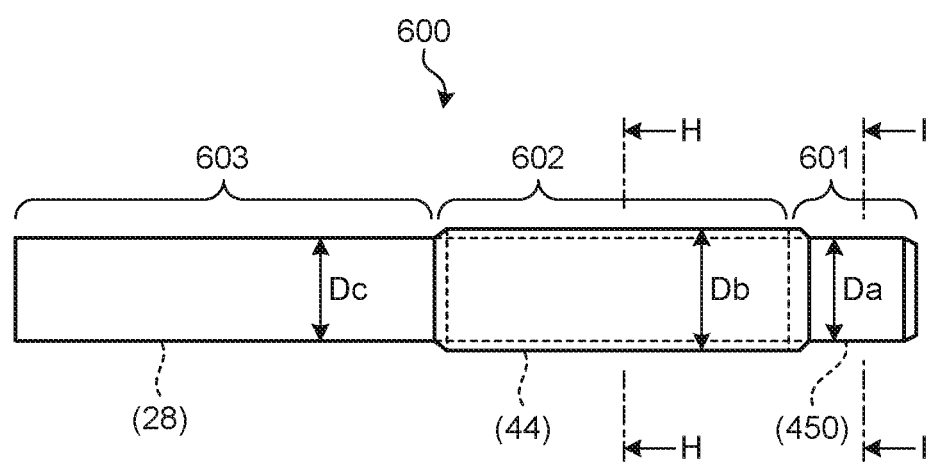
FIG. 34 is a diagram illustrating an example of a method for manufacturing a steering device according to a fifth embodiment and is a diagram illustrating an example of a core.
Figure 35:
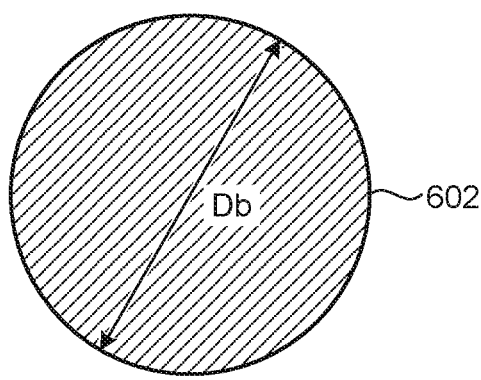
FIG. 35 is a cross-sectional view taken along the line H-H of FIG. 34.
Figure 36:
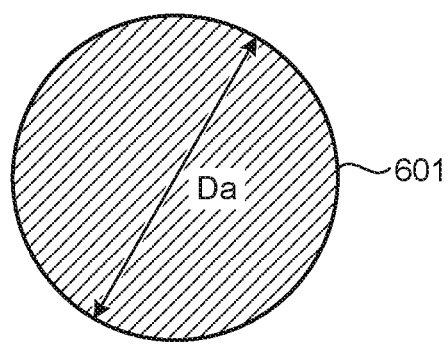
FIG. 36 is a cross-sectional view taken along the line I-I of FIG. 34.

FIG. 34 is a diagram illustrating an example of a core 600 according to the embodiment. FIG. 35 is a cross-sectional view taken along the line H-H of FIG. 34. FIG. 36 is a cross-sectional view taken along the line I-I of FIG. 34. In the embodiment, the core 600 has a cylindrical (columnar) shape and does not include a spline. The core 600 includes a first portion 601 having a diameter Da, a second portion 602 having a diameter Db, and a third portion 603 having a diameter Dc. The diameter Db is larger than the diameter Da and the diameter Dc. The diameter Da and the diameter Dc may be equal to or different from each other. The first portion 601 is a portion that becomes the shaft portion 450. The second portion 602 is a portion that becomes the first spline shaft portion 44. The third portion 603 is a portion that becomes the shaft portion 28.

Figure 37:
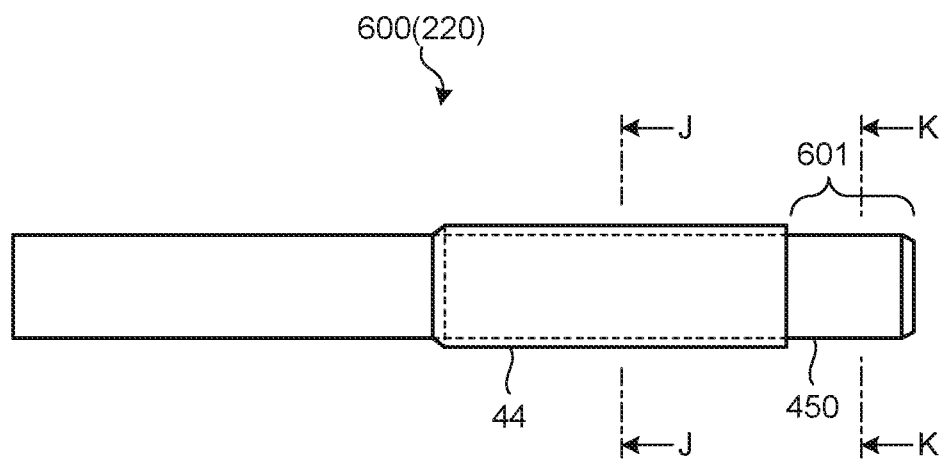
FIG. 37 is a diagram illustrating an example of the method for manufacturing a steering device according to the fifth embodiment and is a diagram illustrating an example of the core.
Figure 38:
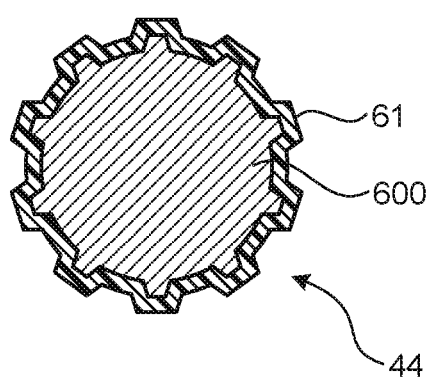
FIG. 38 is a cross-sectional view taken along the line J-J of FIG. 37.
Figure 39:
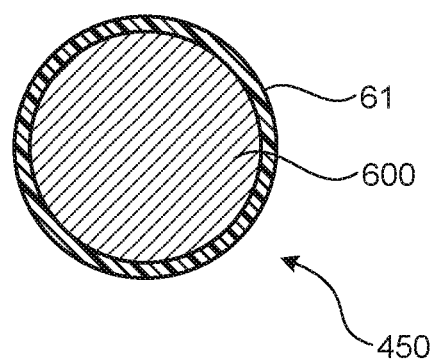
FIG. 39 is a cross-sectional view taken along the line K-K of FIG. 37.

In the core 600, the second portion 602 is processed (by spline-processing). FIG. 37 is a diagram illustrating an example of the processed core 600. FIG. 38 is a cross-sectional view taken along the line J-J of FIG. 37. FIG. 39 is a cross-sectional view taken along the line K-K of FIG. 37.

The second portion 602 is processed to form a spline. The processed second portion 602 becomes the first spline shaft portion 44. The spline may be formed by extruding or rolling.

The first portion 601 is not processed. Accordingly, the core 600 including the cylindrical first portion 601 and the second portion 602 provided with the male spline is manufactured. Subsequently, the first portion 601 and the second portion 602 are immersed into melted synthetic resin. With the above-described process, the inner shaft 220 with the cylindrical shaft portion 450 is manufactured.

Sixth Embodiment

The sixth embodiment will be described. In the description below, the same reference sign will be given to the component equal or identical to the above-described embodiment and the description thereof will be simplified or omitted.

Figure 40:
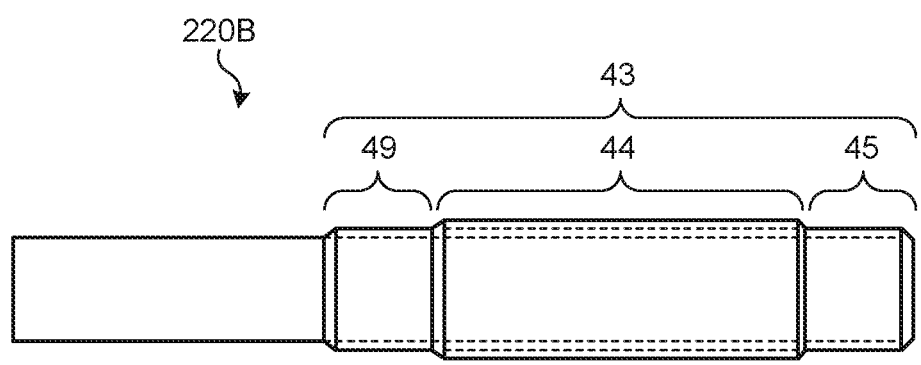
FIG. 40 is a diagram illustrating an example of a steering shaft according to a sixth embodiment.

FIG. 40 is a diagram illustrating an example of an inner shaft 220B according to the embodiment. As illustrated in FIG. 40, the inner shaft 220B includes the first spline shaft portion 44 that includes a synthetic resin surface, the shaft portion 45 that is disposed adjacent to one side of the first spline shaft portion 44 in the axial direction and includes a synthetic resin surface, and the third spline shaft portion 49 that is disposed adjacent to the other side of the first spline shaft portion 44 in the axial direction and includes a metal surface. The outer diameter of the third spline shaft portion 49 is smaller than the outer diameter of the first spline shaft portion 44.

According to the embodiment, the amount of the synthetic resin is decreased. Further, the dimension of the third spline shaft portion 49 in the axial direction is set to be large, and the entire dimension of the spline shaft portion 43 in the axial direction is set to be large. Accordingly, even when the steering shaft 2 is shortened beyond the telescopic movable range, for example, so that the shaft portion 45 is disposed in the second portion space 42 in the secondary collision, the third spline shaft portion 49 can continuously exist in the spline hole portion 40. That is, even when the steering shaft 2 is shortened beyond the telescopic movable range, the spline-fitting state between the spline shaft portion 43 and the spline hole portion 40 is maintained. Accordingly, the vehicle can move while being steered by the steering device 100 when the automobile moves after the secondary collision.

The invention claimed is:

1. A method for manufacturing a steering device comprising:
    manufacturing an outer shaft including an inner space with a spline hole portion;
    manufacturing a metallic core including a spline shaft portion with a surface disposed around a center axis;
    processing the surface of the spline shaft portion so as to manufacture an inner shaft including a first spline shaft portion and a second spline shaft portion, the first spline shaft portion including a first surface formed of synthetic resin, the second spline shaft portion being disposed adjacent to one side of the first spline shaft portion in an axial direction parallel to the center axis, including one end of the core disposed in the inner space, and including a second surface formed of metal, a distance between the second surface and the center axis being smaller than a distance between the center axis and the first surface;
    inserting the second spline shaft portion into the inner space and spline-fitting the spline hole portion and the first spline shaft portion to each other so that the outer shaft and the inner shaft relatively move in the axial direction;
    covering a part of a surface of the spline shaft portion including one end of the core by a mask member, such that the mask member covers splines of the second spline shaft portion; and
    supplying synthetic resin to the spline shaft portion covered by the mask member so as to form the first spline shaft portion,
    wherein the mask member includes a cap member provided with a spline, and
    wherein the splines extend along the core of the first spline shaft portion and the second shaft portion.

2. The method for manufacturing a steering device according to claim 1,
    wherein supplying synthetic resin to the spline shaft portion includes immersing the spline shaft portion covered by the mask member into melted synthetic resin.

3. The method for manufacturing a steering device according to claim 1, further comprising fixing the cap member and the spline shaft portion by a magnet provided in the cap member.

4. The method for manufacturing a steering device according to claim 1, further comprising shaping a film of the synthetic resin by shaving after supplying synthetic resin to the spline shaft portion of the core so as to form the film of the synthetic resin thereon.

5. The method for manufacturing a steering device according to claim 1, wherein the surface of the spline shaft portion of the core is roughened by shot blasting before the synthetic resin is supplied to the spline shaft portion of the core.

6. The method for manufacturing a steering device according to claim 1, further comprising:
    disposing a first column around the inner shaft so that the second spline shaft portion is disposed outside one end of the first column and so that a relative position of the first column with respect to the inner shaft in the axial direction is substantially fixed;
    disposing a second column around the outer shaft so that an end surface of the other end of the outer shaft and an end surface of the other end of the second column in the axial direction are disposed within a same plane and so that a relative position of the second column with respect to the outer shaft in the axial direction is substantially fixed;
    inserting the second spline shaft portion into the outer shaft; and
    coupling the first column and the second column to each other.

7. The method for manufacturing a steering device according to claim 1,
    wherein the inner space includes a first portion space that is disposed adjacent to one side of the spline hole portion in the axial direction and has an inner diameter larger than an inner diameter of the spline hole portion, and
    wherein the outer shaft and the inner shaft are manufactured so that the first spline shaft portion is disposed in the spline hole portion while the second spline shaft portion is disposed in the first portion space.

8. The method for manufacturing a steering device according to claim 7,
    wherein the outer shaft and the inner shaft are manufactured so that the second spline shaft portion is disposed in the first portion space while the inner shaft is disposed at a position closest to one end of a movable range of the inner shaft with respect to the outer shaft in the axial direction.

9. The method for manufacturing a steering device according to claim 1, wherein the second spline shaft portion comprises an extension of metallic core extending through the first spline shaft portion.

* * * * *